(12) United States Patent
Barroux

(10) Patent No.: US 11,330,256 B2
(45) Date of Patent: May 10, 2022

(54) ENCODING DEVICE, ENCODING METHOD, AND DECODING DEVICE

(71) Applicant: FUJITSU LIMITED, Kawasaki (JP)

(72) Inventor: Guillaume Denis Christian Barroux, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/148,620

(22) Filed: Jan. 14, 2021

(65) Prior Publication Data

US 2021/0136361 A1    May 6, 2021

Related U.S. Application Data

(63) Continuation of application No. PCT/JP2018/029794, filed on Aug. 8, 2018.

(51) Int. Cl.
*H04N 19/105* (2014.01)
*H04N 19/13* (2014.01)
(Continued)

(52) U.S. Cl.
CPC .......... *H04N 19/105* (2014.11); *H04N 19/13* (2014.11); *H04N 19/159* (2014.11); *H04N 19/176* (2014.11); *H04N 19/593* (2014.11)

(58) Field of Classification Search
CPC ...... G06T 9/004; H04N 19/11; H04N 19/176; H04N 19/197; H04N 19/463;
(Continued)

(56) References Cited

U.S. PATENT DOCUMENTS

| 8,811,761 B2 * | 8/2014 | Sasai | H04N 19/44 |
| | | | 382/238 |
| 9,426,461 B2 * | 8/2016 | Fu | H04N 19/50 |

(Continued)

FOREIGN PATENT DOCUMENTS

| JP | 2012-147332 A | 8/2012 |
| JP | 2017-228827 A | 12/2017 |

(Continued)

OTHER PUBLICATIONS

Texas Instruments (hereinafter TI) "Digital Comparator", Oct. 8, 2008. URL Link: https://www.electronics-tutorials.ws/combination/comb_8.html. (Year: 2018).*

(Continued)

*Primary Examiner* — Dramos Kalapodas
(74) *Attorney, Agent, or Firm* — Fujitsu Patent Center

(57) ABSTRACT

An encoding device includes: a memory; and a processor coupled to the memory and configured to: estimate a prediction value in a reference direction that is selected when intra prediction in an angle prediction mode is performed in a block to be processed on the basis of a value indicating a reference direction selected when the intra prediction in the angle prediction mode has been performed in an adjacent block adjacent to the block to be processed; and binarize the value indicating the reference direction selected when the intra prediction in the angle prediction mode has been performed in the block to be processed and perform arithmetic encoding for a comparison result between a value of a most significant bit of a binary signal and the prediction value.

11 Claims, 20 Drawing Sheets

(51) Int. Cl.
*H04N 19/159* (2014.01)
*H04N 19/176* (2014.01)
*H04N 19/593* (2014.01)

(58) Field of Classification Search
CPC .... H04N 19/105; H04N 19/13; H04N 19/159; H04N 19/593; H04N 19/157
See application file for complete search history.

(56) References Cited

U.S. PATENT DOCUMENTS

| | | | |
|---|---|---|---|
| 2009/0028247 A1* | 1/2009 | Suh | H04H 40/27 375/240.24 |
| 2009/0110070 A1* | 4/2009 | Takahashi | H04N 19/60 375/240.12 |
| 2010/0195722 A1 | 8/2010 | Boon et al. | |
| 2013/0266232 A1 | 10/2013 | Sato | |
| 2017/0041022 A1* | 2/2017 | Chuang | H04N 19/436 |
| 2017/0085917 A1* | 3/2017 | Hannuksela | H04N 19/30 |
| 2018/0213222 A1* | 7/2018 | Lee | H04N 19/129 |
| 2019/0238841 A1* | 8/2019 | Lee | H04N 19/11 |

FOREIGN PATENT DOCUMENTS

| | | |
|---|---|---|
| WO | 2008/149840 A1 | 12/2008 |
| WO | 2012/096229 A1 | 7/2012 |
| WO | 2018/037949 A1 | 3/2018 |

OTHER PUBLICATIONS

Done Bugdayci et al., "TE5: Results of Test 5. 1. 3 on Inter-layer Intra Mode Prediction", Joint Collaborative Team on Video Coding (JCT-VC) of ITU-T SG 16 WP 3 and ISO/IEC JTC 1/SC 29/WG 11, JCTVC-L0031, 12th Meeting Geneva, CH, pp. 1-4, Jan. 14-23, 2013 (Total 5 pages).

Yu Han et al., "Improvements for Intra Prediction Mode Coding", Joint Video Exploration Team (JVET) of ITU-T SG 16 WP 3 and ISO/IEC JTC 1/SC 29/WG 11, JVET-G0060, 7th Meeting: Torino, IT, pp. 1-4, Jul. 13-21, 2017 (Total 5 pages).

International Search Report and Written Opinion of the International Searching Authority (Form PCT/ISA/210, 220, and 237), mailed in connection with PCT/JP2018/029794 dated Oct. 23, 2018 (Total 10 pages).

* cited by examiner

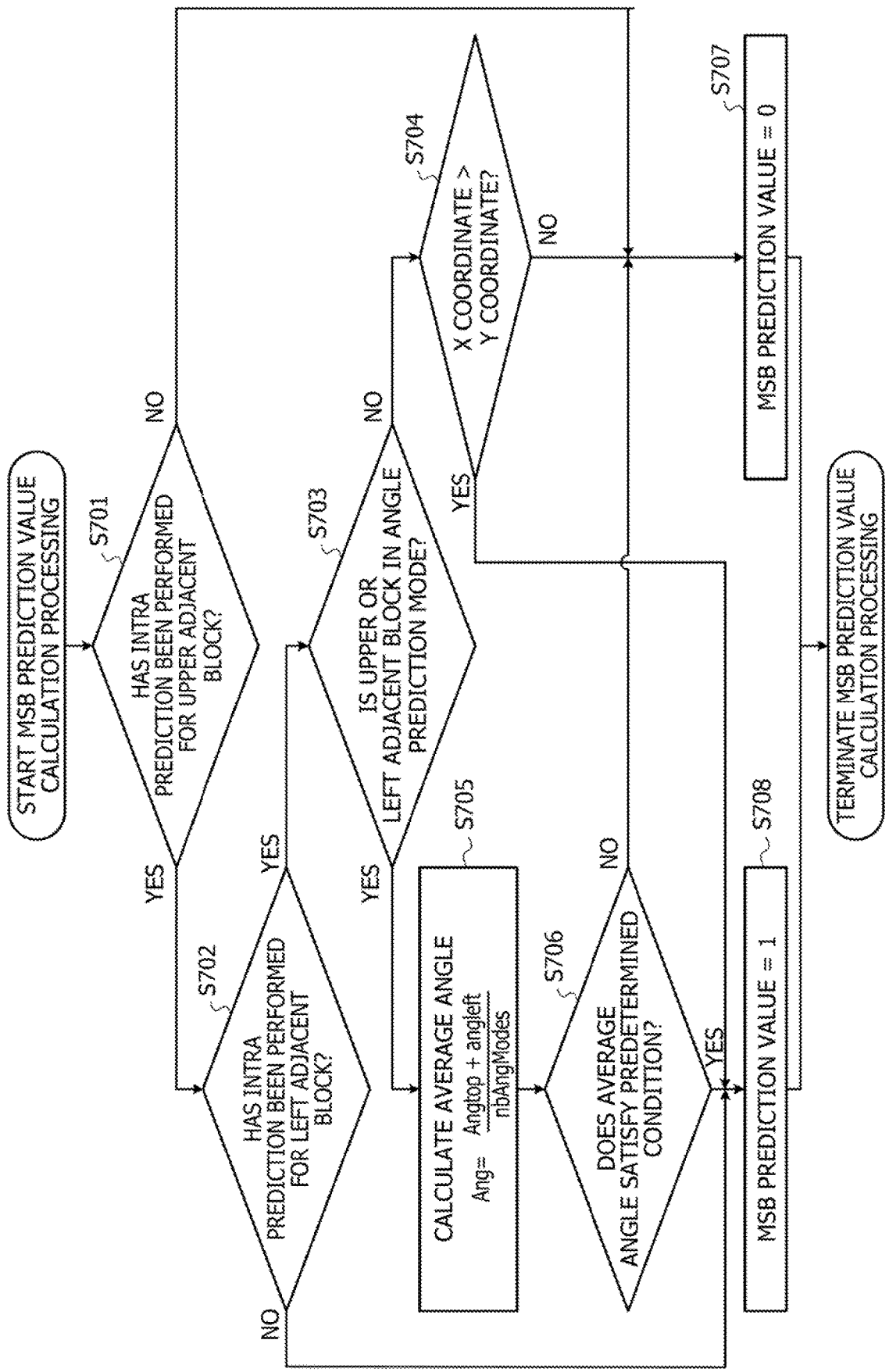

FIG. 17A

Table[IdxT][IdxL][0]

| MSB PREDICTION VALUE | 0≤IdxT≤4 | 5≤IdxT≤7 | 8≤IdxT≤12 | 13≤IdxT≤15 |
|---|---|---|---|---|
| 0≤IdxL≤4 | 0 | 0 | 0 | 1 |
| 5≤IdxL≤7 | 0 | 0 | 1 | 1 |
| 8≤IdxL≤12 | 0 | 1 | 1 | 1 |
| 13≤IdxL≤15 | 0 | 1 | 1 | 1 |

FIG. 17B

Table[IdxT][IdxL][1]

| MSB PREDICTION VALUE | 0≤IdxT≤4 | 5≤IdxT≤7 | 8≤IdxT≤12 | 13≤IdxT≤15 |
|---|---|---|---|---|
| 0≤IdxL≤4 | 0 | 0 | 0 | 1 |
| 5≤IdxL≤7 | 0 | 0 | 0 | 1 |
| 8≤IdxL≤12 | 0 | 1 | 1 | 1 |
| 13≤IdxL≤15 | 1 | 1 | 1 | 1 |

FIG. 17C

Table[IdxT][IdxL][2]

| MSB PREDICTION VALUE | 0≤IdxT≤4 | 5≤IdxT≤7 | 8≤IdxT≤12 | 13≤IdxT≤15 |
|---|---|---|---|---|
| 0≤IdxL≤4 | 0 | 1 | 1 | 1 |
| 5≤IdxL≤7 | 0 | 1 | 1 | 1 |
| 8≤IdxL≤12 | 1 | 1 | 1 | 1 |
| 13≤IdxL≤15 | 1 | 1 | 1 | 1 |

ENCODING DEVICE, ENCODING METHOD, AND DECODING DEVICE

CROSS-REFERENCE TO RELATED APPLICATION

This application is a continuation application of International Application PCT/JP2018/029794 filed on Aug. 8, 2018 and designated the U.S., the entire contents of which are incorporated herein by reference.

FIELD

The embodiment relates to an encoding device, an encoding method, an encoding program, a decoding device, a decoding method, and a decoding program.

BACKGROUND

H.265/HEVC is known as an international standard for compression encoding of moving image data. In H.265/HEVC, two prediction methods: intra prediction and inter prediction are adopted, and three types of prediction modes (planar prediction, DC prediction, and angle prediction) are further specified for intra prediction.

Related art is disclosed in Japanese Laid-open Patent Publication No. 2012-147332 and Japanese Laid-open Patent Publication No. 2017-228827.

SUMMARY

According to an aspect of the embodiments, an encoding device includes: a memory; and a processor coupled to the memory and configured to: estimate a prediction value in a reference direction that is selected when intra prediction in an angle prediction mode is performed in a block to be processed on the basis of a value indicating a reference direction selected when the intra prediction in the angle prediction mode has been performed in an adjacent block adjacent to the block to be processed; and binarize the value indicating the reference direction selected when the intra prediction in the angle prediction mode has been performed in the block to be processed and perform arithmetic encoding for a comparison result between a value of a most significant bit of a binary signal and the prediction value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flowchart illustrating a flow of MSB prediction value calculation processing by the intra reference direction estimation unit of the encoding device according to a first embodiment.

FIG. 17A is a first diagram illustrating a specific example of a table stored in a table storage unit.

FIG. 17B is a second diagram illustrating a specific example of a table stored in the table storage unit.

FIG. 17C is a third diagram illustrating a specific example of a table stored in the table storage unit.

DESCRIPTION OF EMBODIMENTS

Figure 1:
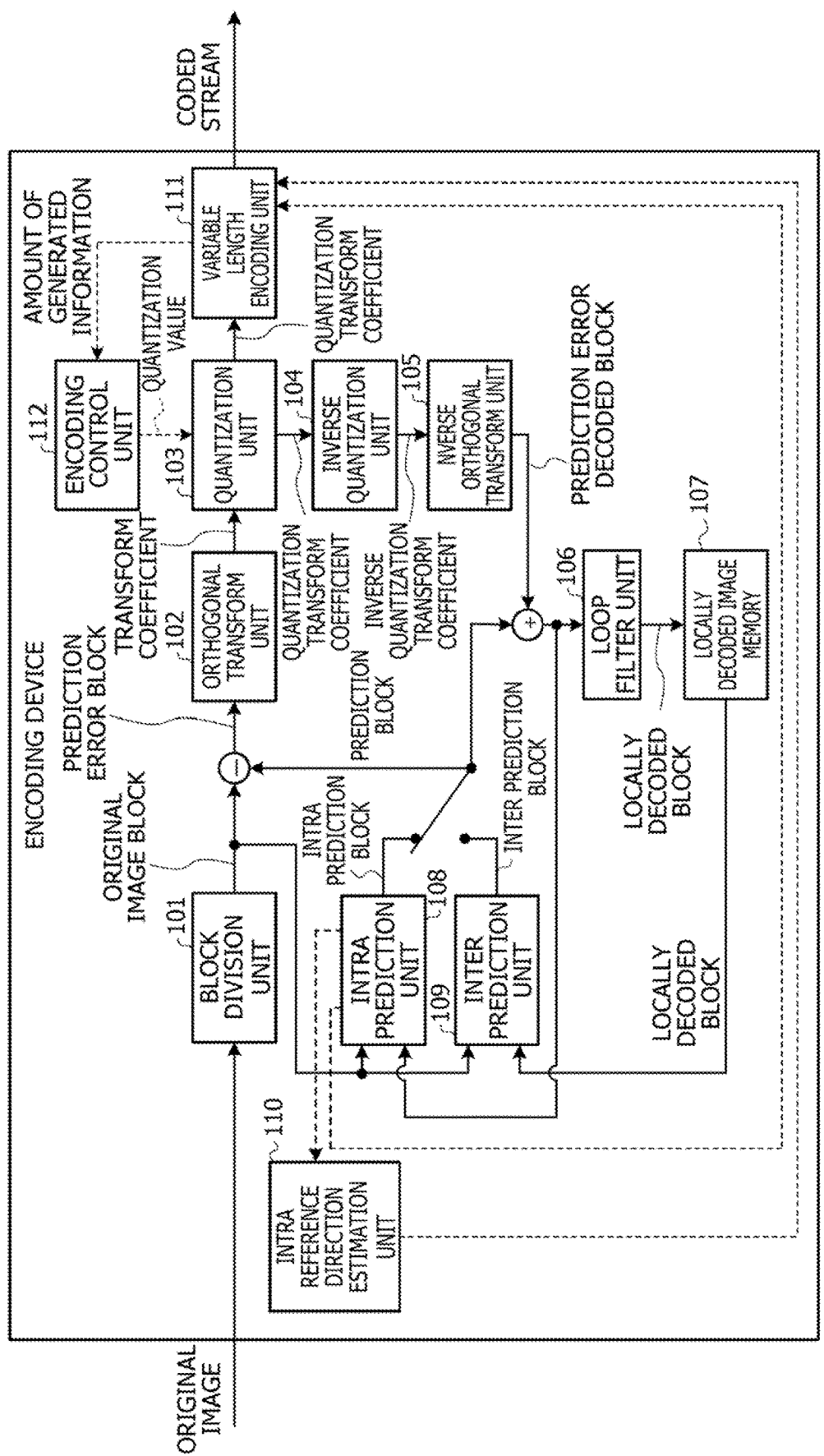
FIG. 1 is a diagram illustrating an example of a functional configuration of an encoding device.

Among the three types of prediction modes, in the intra prediction in the angle prediction mode, a pixel value of a block to be processed is predicted by referring to a selected reference direction among N (for example, N=33) different angles (reference directions) defined in advance.

In the case of the intra prediction in the angle prediction mode, an encoding device arithmetically encodes a binary signal with a number of bits corresponding to the number (N) of the reference directions using an occurrence probability model to generate a coded stream.

Here, a conventional encoding device has arithmetically encoded a binary signal having an occurrence probability that is difficult to estimate using a bypass mode in which the occurrence probability is fixed at 0.5. Therefore, such a binary signal has a problem that reduction of a code amount at the time of generating a coded stream is not sufficient.

One aspect is aimed at reducing the code amount in the intra prediction in the angle prediction mode.

First, an outline of an encoding device and a decoding device according to each of the following embodiments will be described. The encoding device and the decoding device according to each of the following embodiments estimate a prediction value (binary signal) in a reference direction in a block to be processed on the basis of a value indicating a reference direction selected when intra prediction in an angle prediction mode has been performed in an adjacent block when encoding a value indicating a reference direction in the intra prediction in the angle prediction mode. Then, the encoding device and the decoding device reduce a code amount by arithmetically encoding a difference (exclusive OR) between a binary signal of the value indicating the reference direction and the prediction value of the reference direction.

The encoding device and the decoding device increase an occurrence probability (a match rate between the prediction value of the reference direction and the binary signal of the value indicating the reference direction) by estimating a value corresponding to the most significant bit (MSB) of the binary signal of the value indicating the reference direction as the prediction value of the reference direction. Then, in arithmetically encoding the binary signal of the value indicating the reference direction, the encoding device and the decoding device reduce the code amount by increasing, for the most significant bit, a probability of realizing arithmetic encoding in a context mode instead of arithmetic encoding in a bypass mode.

As a result, the encoding device and the decoding device according to each of the following embodiments can reduce the code amount at the time of generating a coded stream in the intra prediction in the angle prediction mode.

Hereinafter, each embodiment will be described with reference to the attached drawings. Note that, in the description and the drawings, components having substantially the same functional configuration are denoted by the same reference numerals, and redundant description is omitted.

First Embodiment

<Functional Configuration of Encoding Device>

First, a functional configuration of an encoding device will be described. An encoding program is installed in the encoding device, and when the program is executed, the encoding device encodes moving image data input as an original image, and transmits a coded stream to a decoding device via a network (not illustrated).

FIG. 1 is a diagram illustrating an example of a functional configuration of the encoding device. As illustrated in FIG. 1, an encoding device 100 includes a block division unit 101, an orthogonal transform unit 102, a quantization unit 103, an inverse quantization unit 104, an inverse orthogonal transform unit 105, a loop filter unit 106, and a locally decoded image memory 107, an intra prediction unit 108, and an inter prediction unit 109. Furthermore, the encoding device 100 includes an intra reference direction estimation unit 110, a variable length encoding unit 111, and an encoding control unit 112.

The block division unit 101 divides each of the frames included in the input moving image data into a plurality of blocks to generate original image blocks.

The orthogonal transform unit 102 acquires a prediction error block that is a difference between the original image block generated in the block division unit 101 and a prediction block generated in the prediction unit to be described below (the intra prediction unit 108 or the inter prediction unit 109). Furthermore, the orthogonal transform unit 102 performs orthogonal transform processing for the acquired prediction error block to calculate a transform coefficient.

The quantization unit 103 quantizes the transform coefficient calculated in the orthogonal transform unit 102 to calculate a quantization transform coefficient.

The inverse quantization unit 104 inversely quantizes the quantization transform coefficient calculated in the quantization unit 103 to calculate an inverse quantization transform coefficient.

The inverse orthogonal transform unit 105 performs inverse orthogonal transform for the inverse quantization transform coefficient calculated in the inverse quantization unit 104 to generate a prediction error decoded block. The prediction block generated in the prediction unit to be described below (the intra prediction unit 108 or the inter prediction unit 109) is added to the prediction error decoded block generated in the inverse orthogonal transform unit 105, so that a locally decoded block is generated.

The loop filter unit 106 filters the generated locally decoded block using a deblocking filter or the like, and stores the filtered locally decoded block in the locally decoded image memory 107.

The intra prediction unit 108 performs the intra prediction to generate an intra prediction block. Note that, hereinafter, description will be given on the assumption that the intra prediction in an angle prediction mode is performed in the intra prediction unit 108. Specifically, when performing the intra prediction in each block to be processed of the original image block, the intra prediction unit 108 refers to the locally decoded block for which the intra prediction has been performed, the locally decoded block being a block adjacent to an upper side or a left side of the block to be processed.

Furthermore, the intra prediction unit 108 notifies the intra reference direction estimation unit 110 of "information regarding the intra prediction" of when the intra prediction has been performed in the block adjacent to the upper side or the left side of the block to be processed.

Furthermore, the intra prediction unit 108 notifies the intra reference direction estimation unit 110 of "information regarding a position" (X coordinate and Y coordinate) of each region in the block to be processed.

Moreover, the intra prediction unit 108 notifies the variable length encoding unit 111 of "a value indicating a reference direction" selected when the intra prediction in the angle prediction mode has been performed in the block to be processed.

The inter prediction unit 109 performs inter prediction for each block to be processed of the original image block, using the locally decoded block in another frame, to generate an inter prediction block.

The encoding device 100 selects at least either the intra prediction block generated in the intra prediction unit 108 or the inter prediction block generated in the inter prediction unit 109. The selected prediction block is used for calculating a difference from the block to be processed of the original image block, and input to the orthogonal transform unit 102 as a prediction error block.

Note that, hereinafter, description will be given on the assumption that the intra prediction block is selected as the prediction block.

The intra reference direction estimation unit 110 is an example of an estimation unit. In the case where the intra prediction block is selected as the prediction block, the intra reference direction estimation unit 110 acquires information regarding a position notified from the intra prediction unit 108. Moreover, the intra reference direction estimation unit 110 acquires the information regarding the intra prediction notified from the intra prediction unit 108.

Furthermore, the intra reference direction estimation unit 110 estimates a prediction value of a reference direction in the block to be processed on the basis of the acquired information regarding a position or the acquired information regarding the intra prediction. Moreover, the intra reference direction estimation unit 110 notifies the variable length encoding unit 111 of the estimated prediction value of a reference direction.

The variable length encoding unit 111 is an example of an encoding unit, and encodes the quantization transform coefficient calculated in the quantization unit 103.

Furthermore, the variable length encoding unit 111 binarizes the value indicating a reference direction notified from the intra prediction unit 108, and compares a value of a most significant bit of a binary signal with the prediction value of a reference direction (calculates an exclusive OR). Moreover, the variable length encoding unit 111 arithmetically encodes the binary signal including a comparison result (exclusive OR).

Thereby, the variable length encoding unit 111 generates a coded stream for the intra prediction in the angle prediction mode and outputs the generated coded stream to a decoding device (not illustrated).

The encoding control unit 112 determines a quantization value such that an amount of information (amount of generated information) of the coded stream generated by the variable length encoding unit 111 becomes a predetermined amount of information, and notifies the quantization unit 103 of the determined quantization value. As a result, the quantization unit 103 calculates the quantization transform coefficient using the notified quantization value.

<Hardware Configuration of Encoding Device>

Figure 2:
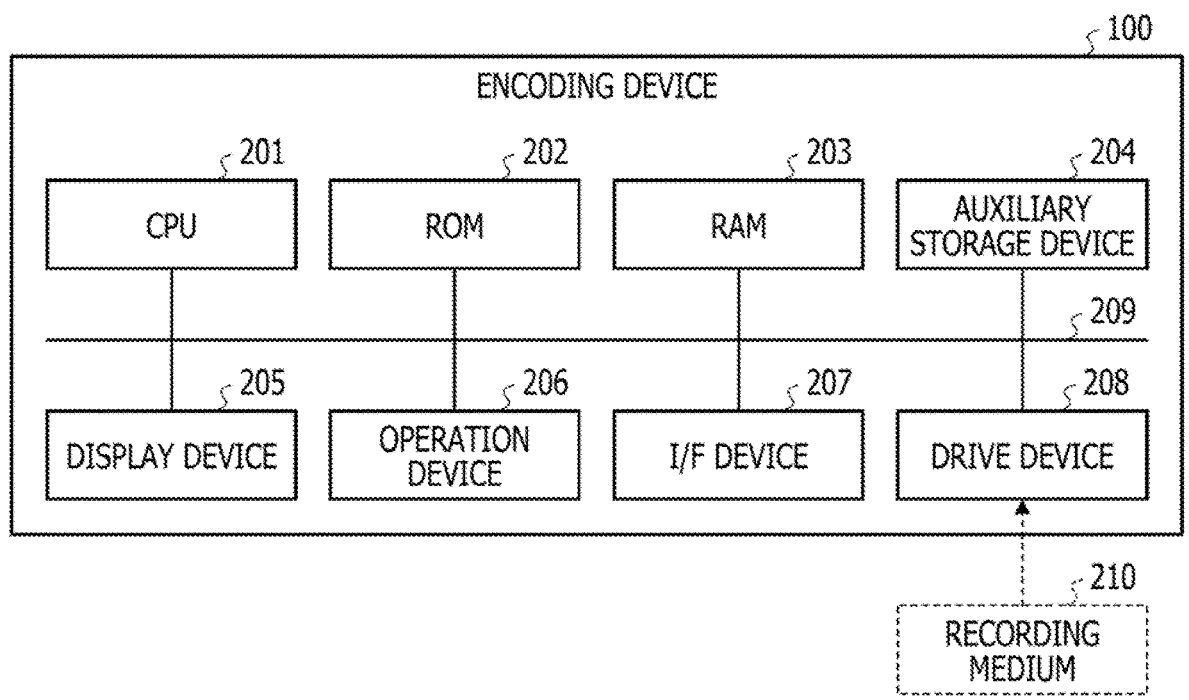
FIG. 2 is a diagram illustrating an example of a hardware configuration of the encoding device.

Next, a hardware configuration of the encoding device 100 will be described. FIG. 2 is a diagram illustrating an example of a hardware configuration of the encoding device. As illustrated in FIG. 2, the encoding device 100 includes a central processing unit (CPU) 201, a read only memory (ROM) 202, and a random access memory (RAM) 203. The CPU 201, the ROM 202, and the RAM 203 form a so-called computer.

Furthermore, the encoding device 100 includes an auxiliary storage device 204, a display device 205, an operation device 206, an interface (I/F) device 207, and a drive device 208. Note that the pieces of the hardware of he encoding device 100 are connected to one another via a bus 209.

The CPU 201 is an arithmetic device that executes various programs (for example, an encoding program and the like) installed in the auxiliary storage device 204.

The ROM 202 is a nonvolatile memory. The ROM 202 functions as a main storage device that stores various programs, data, and the like needed for the CPU 201 to execute the various programs installed in the auxiliary storage device 204. For example, the ROM 202 functions as a main storage device that stores, for example, a boat program such as a basic input/output system (BIOS) or an extensible firmware interface (EFI).

The RAM 203 is a volatile memory such as a dynamic random access memory (DRAM) or a static random access memory (SRAM). The RAM 203 functions as a main storage device that provides a work area expanded when the various programs installed in the auxiliary storage device 204 are executed by the CPU 201.

The auxiliary storage device 204 is an auxiliary storage device that stores various programs and data used when the various programs are executed.

The display device 205 is a display device that displays an internal state of the encoding device 100. The operation device 206 is an input device used by an administrator of the encoding device 100 for inputting various instructions to the encoding device 100.

The I/F device 207 is a connection device for being connected to another device (for example, the decoding device) and transmitting/receiving the coded stream to/from the other device.

The drive device 208 is a device for setting a recording medium 210. The recording medium 210 referred here includes a medium for optically, electrically, or magnetically recording information, such as a CD-ROM, a flexible disk, or a magneto-optical disk. Alternatively, the recording medium 210 may include a semiconductor memory or the like that electrically records information, such as a ROM or a flash memory.

Note that the various programs to be installed in the auxiliary storage device 204 are installed when, for example, the distributed recording medium 210 is set in the drive device 208, and the various programs recorded in the recording medium 210 are read by the drive device 208. Alternatively, the various programs to be installed in the auxiliary storage device 204 may be downloaded from a network (not illustrated) and installed.

<Description of Block to be Processed>

Figure 3:
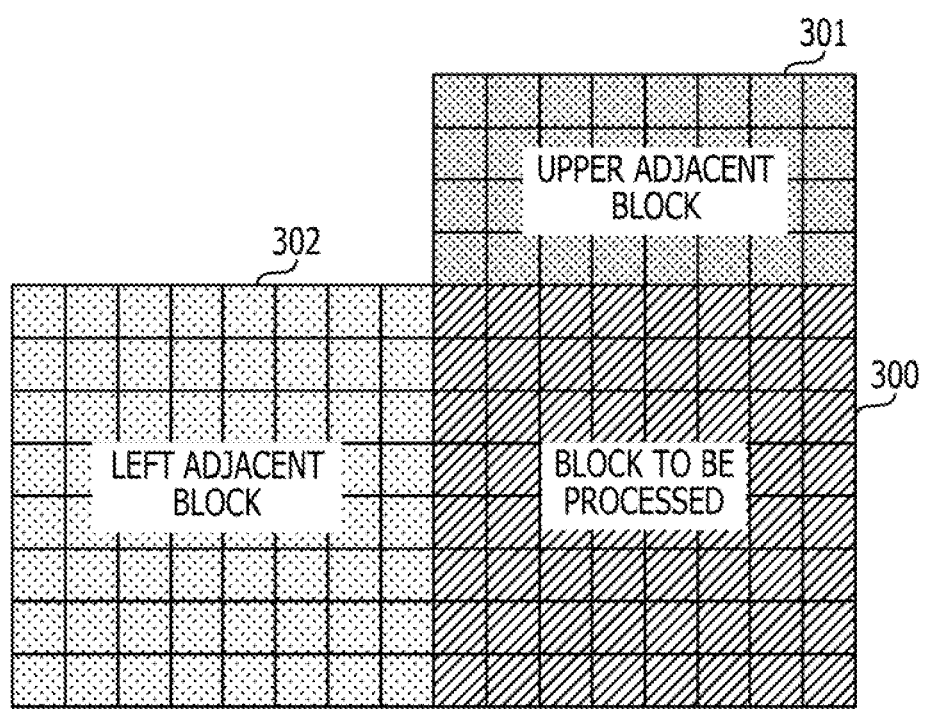
FIG. 3 is a diagram illustrating an example of a block to be processed that is processed in an intra prediction unit of the encoding device.

Next, the block to be processed, which is processed by the intra prediction unit 108 of the encoding device 100, will be described. FIG. 3 is a diagram illustrating an example of the block to be processed that is processed in the intra prediction unit of the encoding device.

The intra prediction unit 108 refers to a decoded block (that is, the locally decoded block) adjacent to a block to be processed 300 in a frame including the block to be processed 300, and predicts a pixel value of each pixel in the block to be processed 300.

The example in FIG. 3 illustrates an upper adjacent block 301 adjacent to the upper side and a left adjacent block 302 adjacent to the left side of the block to be processed 300 among the locally decoded blocks.

<Reference Direction in Intra Prediction in Angle Prediction Mode>

Figure 4A:
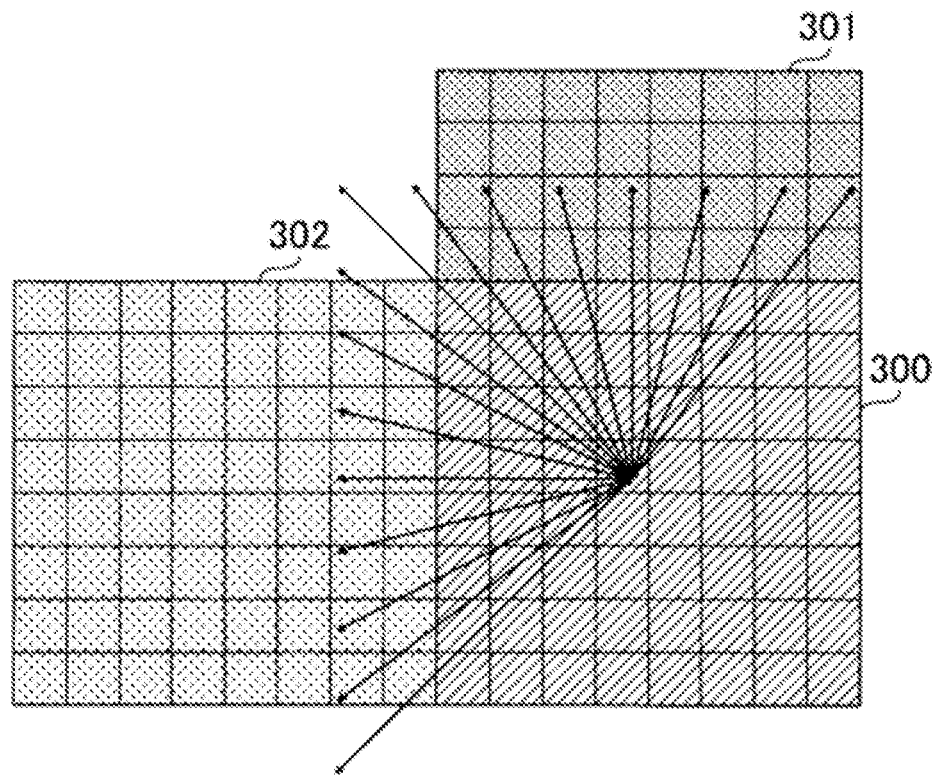
FIG. 4A is a first diagram for describing a reference direction of intra prediction in an angle prediction mode, which is executed in the intra prediction unit of the encoding device.
Figure 4B:
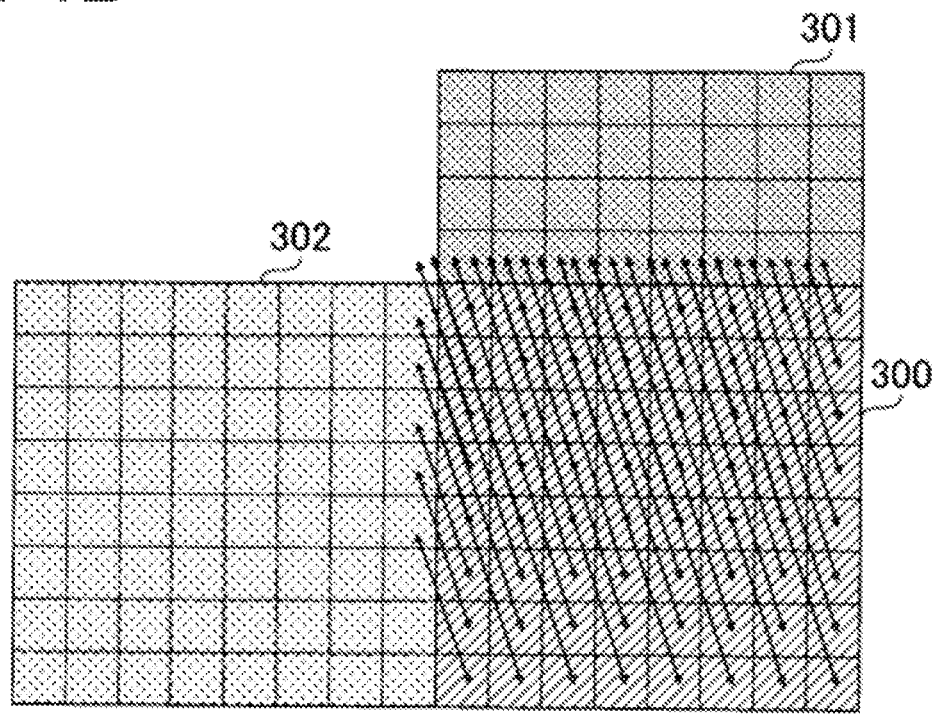
FIG. 4B is a second diagram for describing a reference direction of intra prediction in an angle prediction mode, which is executed in the intra prediction unit of the encoding device.

Next, a reference direction of the intra prediction in the angle prediction mode, which is executed by the intra prediction unit 108 of the encoding device 100, will be described. FIGS. 4A and 4B are first and second diagrams for describing a reference direction of the intra prediction in the angle prediction mode, which is executed by the intra prediction unit of the encoding device.

In H.265/HEVC, thirty-three reference directions are specified as reference directions that can be referred to when the intra prediction in the angle prediction mode is executed. Furthermore, in the next-generation video codec currently under consideration (next-generation codec following H.265/HEVC), the number of reference directions is expected to expand to sixty five.

FIG. 4A illustrates sixteen reference directions out of the thirty-three reference directions specified in H.265/HEVC, using sixteen arrows. In each arrow, a start point position represents a region to be processed, and an end point position represents a direction referred to.

Meanwhile, FIG. 4B illustrates sixty-five reference directions assumed in the next-generation codec, using sixty-five arrows. The meaning of each arrow is similar to that in FIG. 4A.

<Functional Configuration of Intra Prediction Unit>

Figure 5A:
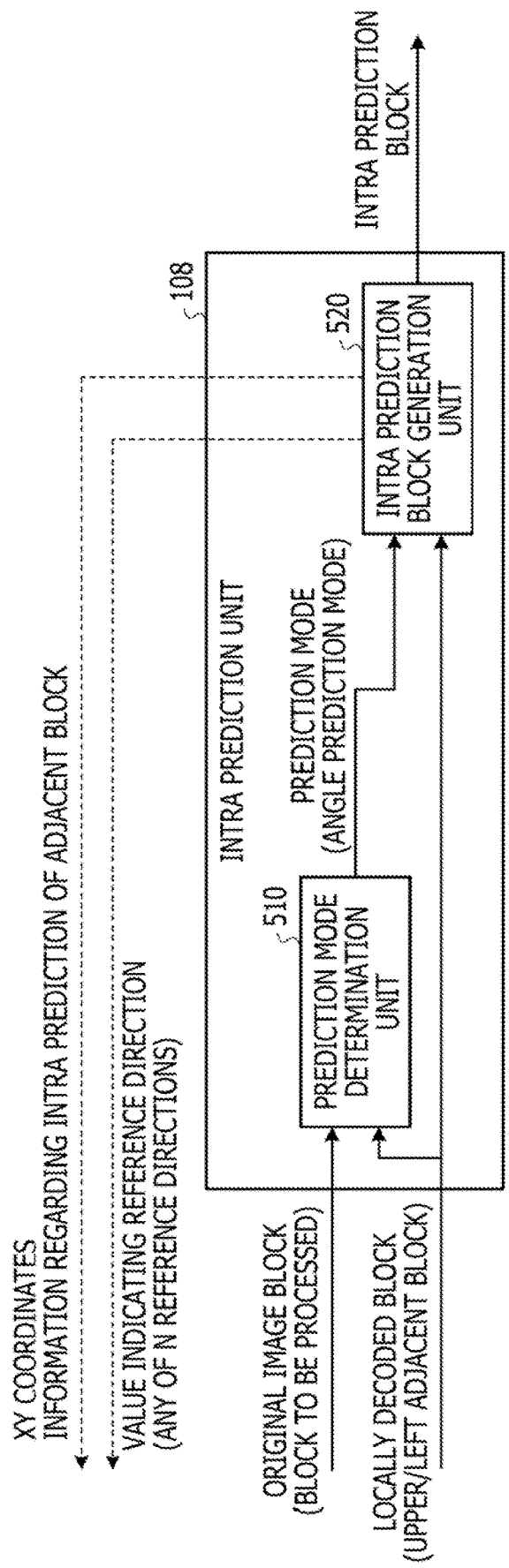
FIG. 5A is a first diagram illustrating details of a functional configuration of the intra prediction unit of the encoding device.
Figure 5B:
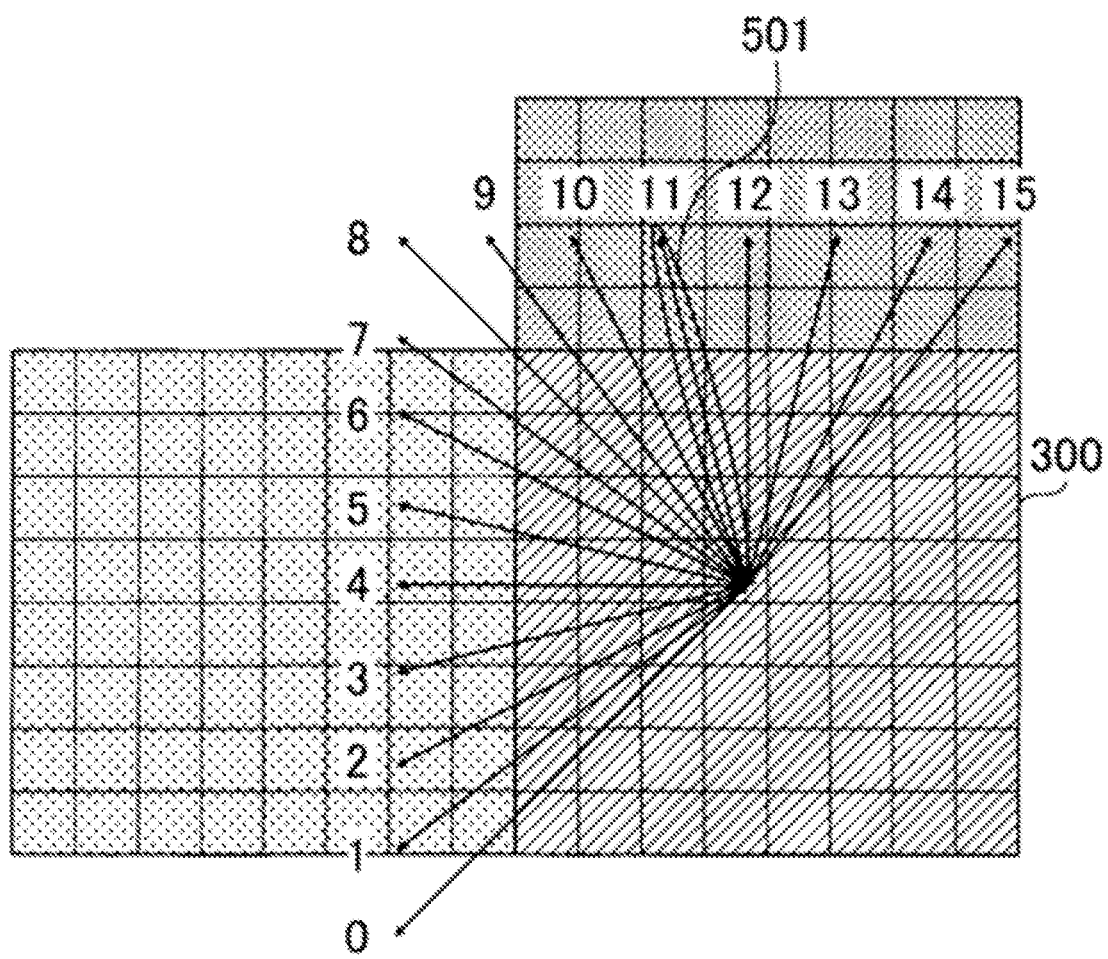
FIG. 5B is a second diagram illustrating details of a functional configuration of the intra prediction unit of the encoding device.

Next, a functional configuration of the intra prediction unit 108 that executes the intra prediction in the angle prediction mode will be described. FIGS. 5A and 5B are first and second diagrams illustrating details of a functional configuration of the intra prediction unit of the encoding device.

As illustrated in FIG. 5A, the intra prediction unit 108 includes a prediction mode determination unit 510 and an intra prediction block generation unit 520.

The prediction mode determination unit 510 generates prediction pixel values by the intra prediction in each of the three types of prediction modes (planar prediction, DC prediction, and angle prediction), and determines a prediction mode that minimizes a prediction error. For example, in the intra prediction in the angle prediction mode, the prediction pixel value is generated using the block to be processed, and the upper adjacent block and the left adjacent block, and the prediction error is calculated.

Furthermore, the prediction mode determination unit 510 notifies the intra prediction block generation unit 520 of the determined prediction mode (here, the angle prediction mode).

When receiving the notification from the prediction mode determination unit 510, the intra prediction block generation unit 520 generates and outputs the intra prediction block for the block to be processed by referring to the selected reference direction. At this time, the intra prediction block generation unit 520 notifies the variable length encoding unit 111 of a value indicating the selected reference direction (a value indicating any of the N reference directions).

Furthermore, the intra prediction block generation unit 520 notifies the intra reference direction estimation unit 110 of information (X coordinate and Y coordinate) regarding the position in the block to be processed, of each region in the block to be processed.

Moreover, the intra prediction block generation unit 520 notifies the intra reference direction estimation unit 110 of the information regarding the intra prediction of when the intra prediction has been performed in the upper adjacent block or the left adjacent block of the block to be processed.

FIG. 5B is a diagram illustrating a state in which a reference direction is selected in the block to be processed 300 in the intra prediction in the angle prediction mode. Specifically, FIG. 5B illustrates a state in which the eleventh reference direction (arrow 501) has been selected among the sixteen reference directions.

In this case, the intra prediction block generation unit 520 notifies the variable length encoding unit 111 of "11" as the value indicating the reference direction. Furthermore, the intra prediction block generation unit 520 notifies the intra reference direction estimation unit 110 of the X coordinate and the Y coordinate of the position of the start point of the arrow 501 as the information regarding a position.

Moreover, the intra prediction block generation unit 520 notifies the intra reference direction estimation unit 110 of, for example, the value indicating the reference direction selected when the intra prediction in the angle prediction mode has been performed in the upper or left adjacent block of the block to be processed 300.

Note that, when the encoding for the block to be processed 300 has been completed, the block to be processed 300 becomes an upper adjacent block or a left adjacent block of another block to be processed. In this case, the intra prediction block generation unit 520 holds the information regarding the intra prediction of when the intra prediction has been performed for the block to be processed 300. Then, the intra prediction block generation unit 520 notifies the intra reference direction estimation unit 110 as the information regarding the intra prediction of an adjacent block when performing the intra prediction in the angle prediction mode for another block to be processed.

<Functional configuration of Intra Reference Direction Estimation Unit>

Figure 6:
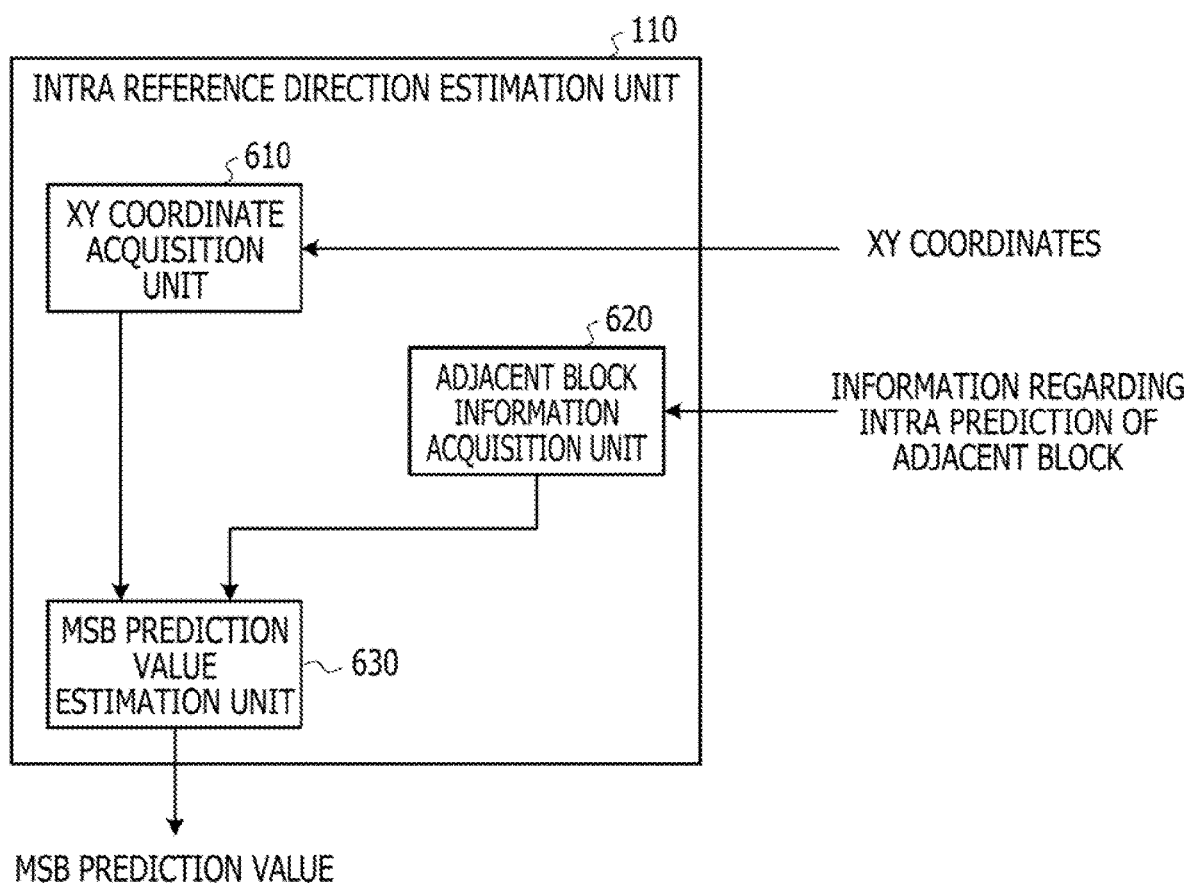
FIG. 6 is a diagram illustrating details of a functional configuration of an intra reference direction estimation unit of the encoding device according to the first embodiment.

Next, details of a functional configuration of the intra reference direction estimation unit 110 will be described. FIG. 6 is a diagram illustrating details of a functional configuration of the intra reference direction estimation unit of the encoding device according to the first embodiment.

As illustrated in FIG. 6, the intra reference direction estimation unit 110 includes an XY coordinate acquisition unit 610, an adjacent block information acquisition unit 620, and an MSB prediction value estimation unit 630.

The XY coordinate acquisition unit 610 acquires the information (X coordinate and Y coordinate) regarding a position of each region in the block to be processed from the intra prediction unit 108, and notifies the MSB prediction value estimation unit 630.

The adjacent block information acquisition unit 620 acquires the information regarding the intra prediction of an adjacent block adjacent to the block to be processed.

The information regarding the intra prediction of the adjacent block acquired by the adjacent block information acquisition unit 620 includes
  the intra prediction in the angle prediction mode having been performed for the upper adjacent block,
  the value indicating the reference direction selected in each region of the upper adjacent block,
  the number of regions of the upper adjacent block,
  the intra prediction in the angle prediction mode having been performed for the left adjacent block,
  the value indicating the reference direction selected in each region of the left adjacent block,
  the number of regions of the left adjacent block,
  and the like.

Furthermore, the adjacent block information acquisition unit 620 notifies the MSB prediction value estimation unit 630 of the acquired information regarding the intra prediction of the adjacent blocks.

The MSB prediction value estimation unit 630 estimates an MSB prediction value on the basis of the information regarding a position of each region to be processed notified from the XY coordinate acquisition unit 610, and the information regarding the intra prediction of the adjacent blocks notified from the adjacent block information acquisition unit 620.

The MSB prediction value is a prediction value of a reference direction, and refers to a value corresponding to the most significant bit (MSB) in the case of binarizing the value indicating a reference direction estimated in the block to be processed. Note that, in a case where the sixteen reference directions are represented by four-bit binary signals, as in the example in FIG. 5B, the bit value of the most significant bit being "0" means that the reference direction is any of horizontal directions. Furthermore, the bit value of the most significant bit being "1" means that the reference direction is any of vertical directions.

That is, the MSB prediction value estimation unit 630 estimates whether the reference direction estimated in the block to be processed in the intra prediction in the angle prediction mode belongs to at least a horizontal direction group or a vertical direction group.

For example, in a case where the region to be processed is located in a lower left position in the block to be processed (that is, in a case where the X coordinate of the region is equal to or lower than the Y coordinate), a possibility that any of the horizontal directions is the reference direction is high. In such a case, the MSB prediction value estimation unit 630 estimates "0" as the MSB prediction value.

Meanwhile, in a case where the region to be processed is located in an upper right position in the block to be processed (that is, in a case where the X coordinate of the region is larger than the Y coordinate), a possibility that any of the vertical directions is the reference direction is high. In such a case, the MSB prediction value estimation unit 630 estimates "1" as the MSB prediction value.

Furthermore, it is assumed that, in the intra prediction in the angle prediction mode for the upper adjacent block or the left adjacent block of the block to be processed, many of the horizontal directions are selected as the reference directions. In this case, a possibility that any of the horizontal directions is selected as the reference direction in the block to be processed is high. In such a case, the MSB prediction value estimation unit 630 estimates "0" as the MSB prediction value.

Meanwhile, it is assumed that, in the intra prediction in the angle prediction mode for the upper adjacent block or the left adjacent block of the block to be processed, many of the vertical directions are selected as the reference directions. In this case, a possibility that any of the vertical directions is selected as the reference direction in the block to be processed is high. In such a case, the MSB prediction value estimation unit 630 estimates "1" as the MSB prediction value.

Note that the MSB prediction value estimation unit 630 outputs the estimated MSB prediction value to the variable length encoding unit 111.

<Flow of MSB Prediction Value Calculation Processing by Intra Reference Direction Estimation Unit>

Next, MSB prediction value calculation processing by the intra reference direction estimation unit 110 will be described according to FIG. 7 with reference to FIGS. 8A to 11B. Note that FIG. 7 is a flowchart illustrating a flow of the MSB prediction value calculation processing by the intra reference direction estimation unit of the encoding device according to the first embodiment. Furthermore, FIGS. 8A to 11B are the first to seventh diagrams illustrating specific examples of the MSB prediction value calculation processing.

As illustrated in FIG. 7, in step S701, the MSB prediction value estimation unit 630 acquires the information regarding the intra prediction of the adjacent blocks notified from the adjacent block information acquisition unit 620. Furthermore, the MSB prediction value estimation unit 630 determines whether the intra prediction has been performed for the upper adjacent block of the block to be processed on the basis of the acquired information regarding the intra prediction of the adjacent block (see the thick line frame in FIG. 8A).

In step S701, in a case where it is determined that the intra prediction has not been performed (in the case of NO in step S701), the processing proceeds to step S707.

On the other hand, in a case where it is determined that the intra prediction has been performed in step S701 (in the case of YES in step S702), the processing proceeds to step S702.

Figure 8A:
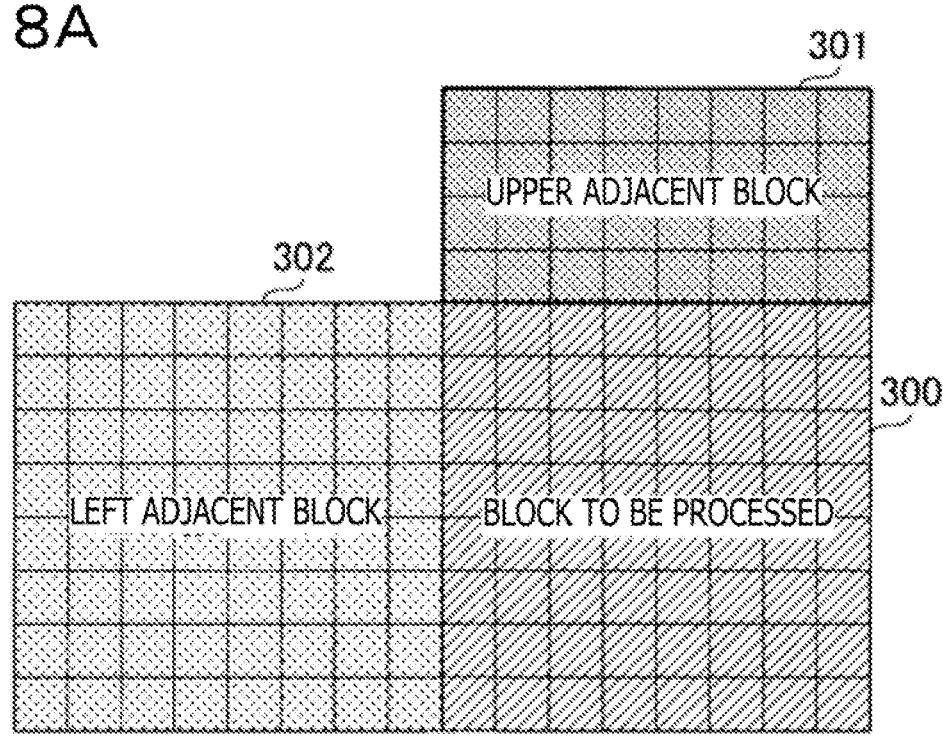
FIG. 8A is a first diagram illustrating a specific example of the MSB prediction value calculation processing.
Figure 8B:
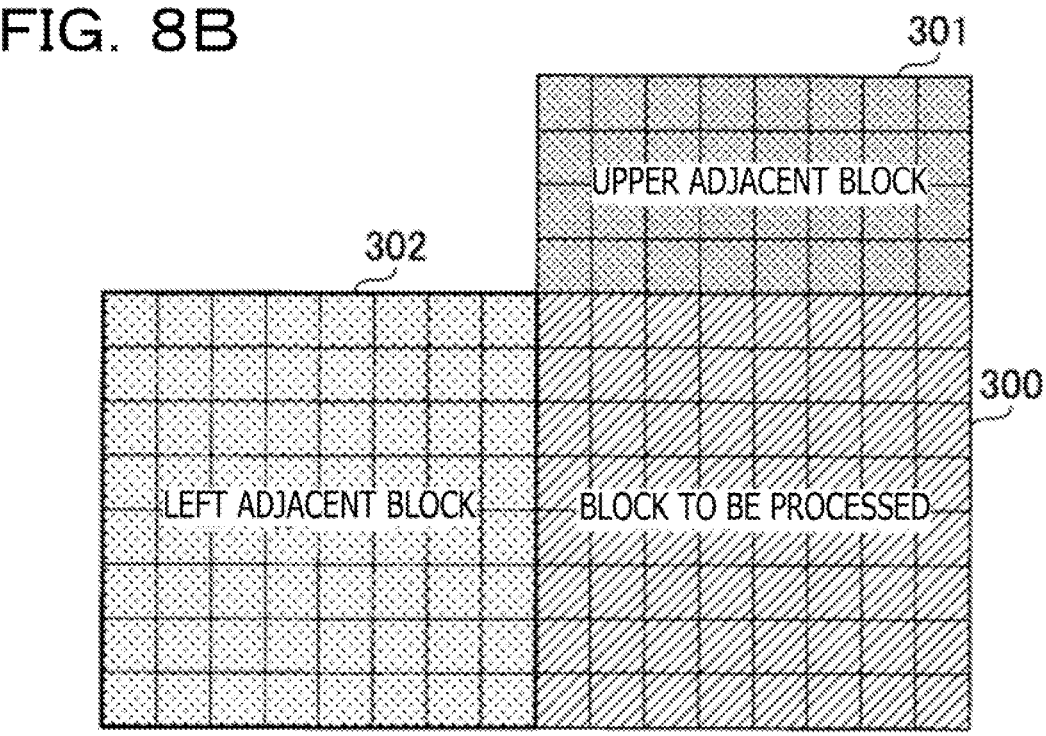
FIG. 8B is a second diagram illustrating a specific example of the MSB prediction value calculation processing.

In step S702, the MSB prediction value estimation unit 630 determines whether the intra prediction has been performed for the left adjacent block of the block to be processed on the basis of the acquired information regarding the intra prediction of the adjacent block (see the thick line frame in FIG. 8B).

In step S702, in a case where it is determined that the intra prediction has not been performed (in the case of NO in step S702), the processing proceeds to step S708. On the other hand, in a case where it s determined that the intra prediction has been performed in step S702 (in the case of YES in step S702), the processing proceeds to step S703.

Figure 8C:
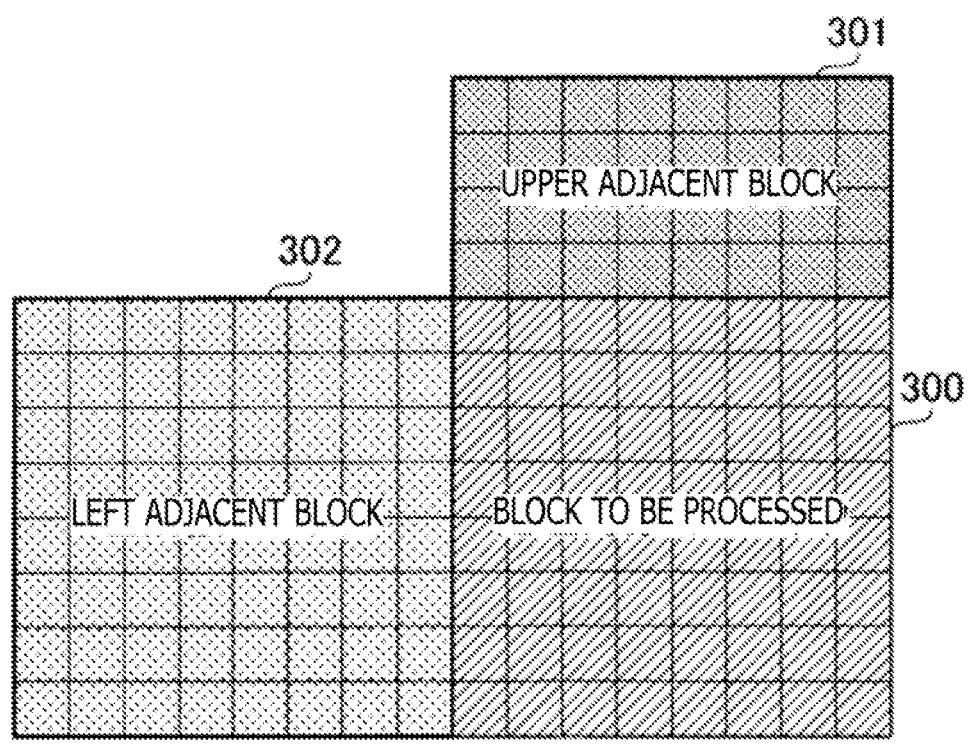
FIG. 8C is a third diagram illustrating a specific example of the MSB prediction value calculation processing.

In step S703, the MSB prediction value estimation unit 630 determines whether the intra prediction performed for the upper or left adjacent block is the angle prediction mode on the basis of the acquired information regarding the intra prediction of the adjacent block (see the thick line frame in FIG. 8C).

In step S703, in a case where it is determined that the intra predictions performed in both the upper adjacent block and the left adjacent block are not the angle prediction mode (in the case of NO in step S703), the processing proceeds to step S704.

In step S704, the MSB prediction value estimation unit 630 acquires the information regarding a position of each region in the block to be processed from the XV coordinate acquisition unit 610. Furthermore, the MSB prediction value estimation unit 630 determines whether the position in the block to be processed, of each region, is located in the upper right position or the lower left position on the basis of the acquired information regarding a position.

Figure 9:
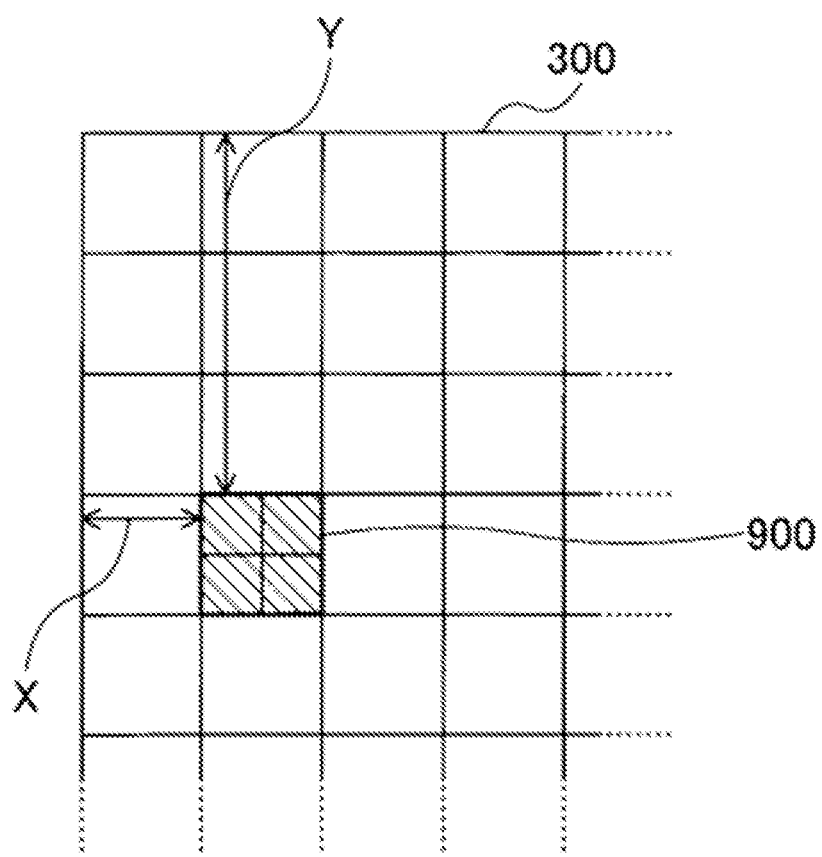
FIG. 9 is a fourth diagram illustrating a specific example of the MSB prediction value calculation processing.
Figure 10:
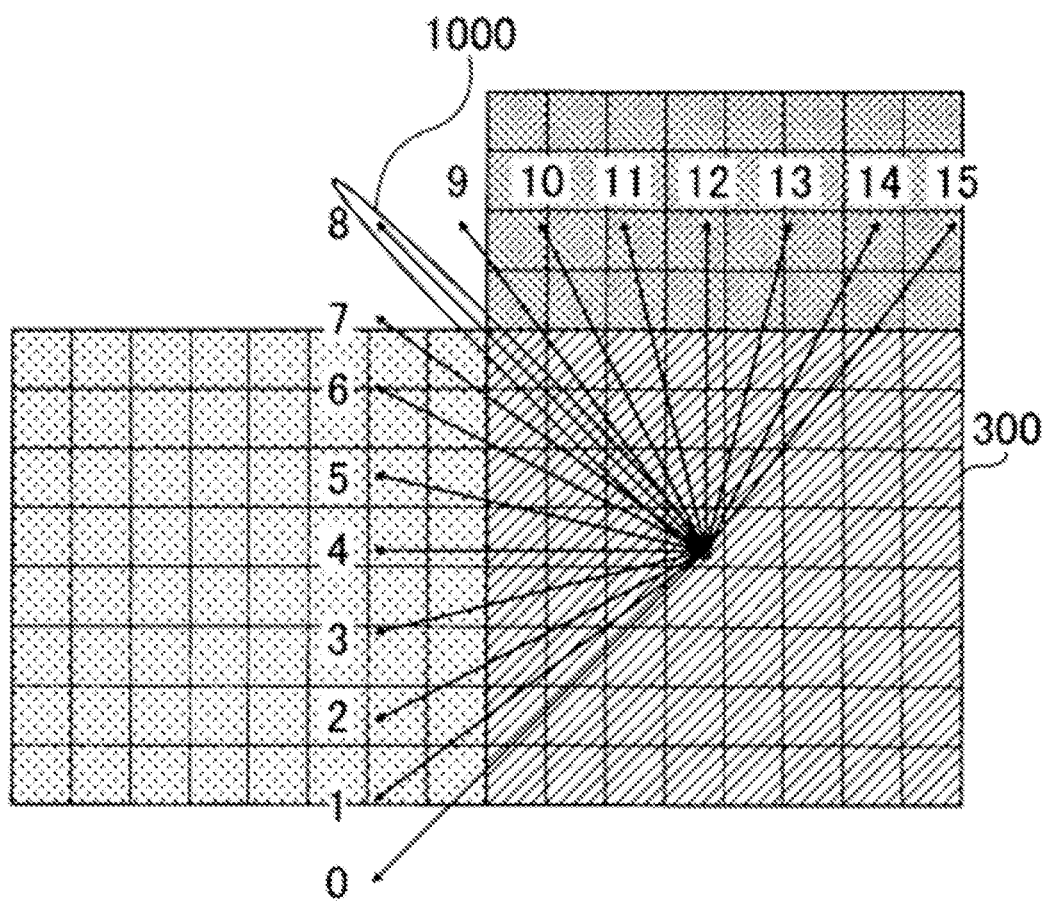
FIG. 10 is a fifth diagram illustrating a specific example of the MSB prediction value calculation processing.

Specifically, the MSB prediction value estimation unit 630 determines whether the X coordinate of a region to be processed 900 is larger than the Y coordinate (see FIG. 9). In step S704, in a case where it is determined that the X coordinate is larger than the Y coordinate (in the case of YES in step S704), the processing proceeds to step S708. Furthermore, in step S704, in a case where it is determined that the X coordinate is equal to or smaller than the Y coordinate (in the case of NO in step S704), the processing proceeds to step S707.

Meanwhile, in step S703, in a case where it is determined that the mode is the angle prediction mode (in the case of YES in step S703), the processing proceeds to step S705. In step S705, the MSB prediction value estimation unit 630 calculates an average angle Ang from the following expression on the basis of the acquired information regarding the intra prediction of the adjacent block.

$$Ang = \frac{Ang_{top} + Ang_{left}}{nbAngModes} \quad \text{[Expression 1]}$$

Note that, in the above expression, $Ang_{top}$ is the value indicating the reference direction selected in each region of the upper adjacent block, and "0" is input in the case of not being the angle prediction mode. Furthermore, $Ang_{left}$ is the value indicating the reference direction selected in each region of the left adjacent block, and "0" is input in the case of not being the angle prediction mode. Moreover, nbAng-$_{Modes}$ is the number of blocks for which the intra prediction in the angle prediction mode has been performed for the upper adjacent block and the left adjacent block, and "1" or "2" is input.

In step S706, the MSB prediction value estimation unit 630 determines whether the average angle Ang calculated in step S705 satisfies a predetermined condition. Specifically, the MSB prediction value estimation unit 630 determines whether the average angle Ang calculated in step S705 is larger than an angle to a top of the left adjacent block of the black to be processed as viewed from the position of the region to be processed (see the arrow 1000 in FIG. 10). Thereby, the MSB prediction value estimation unit 630 can determine whether the reference direction in each region in the block to be processed is either the horizontal direction or the vertical direction.

Figure 11A:
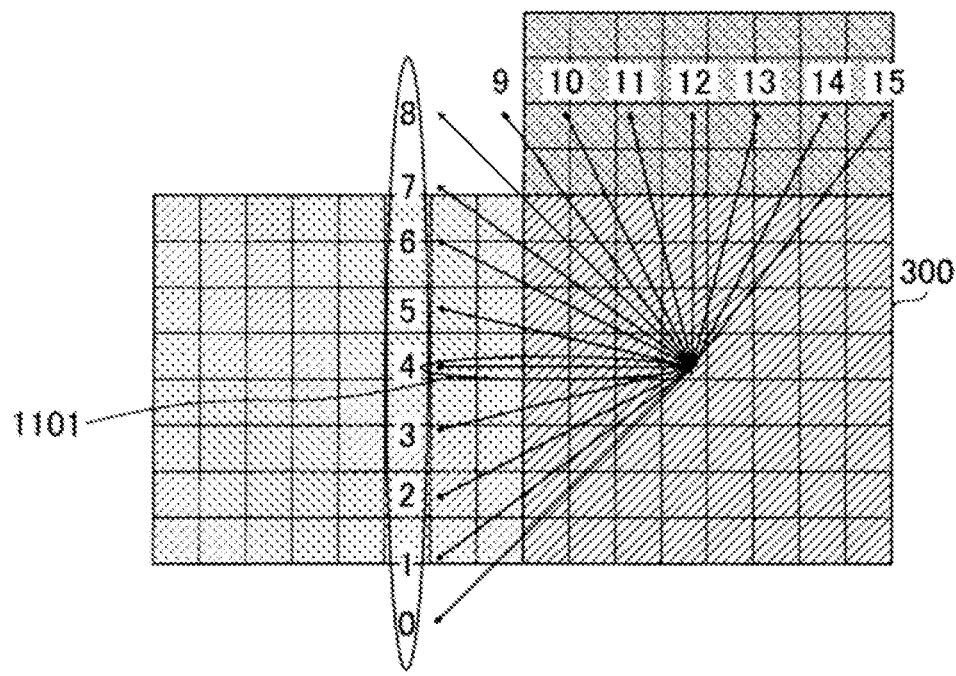
FIG. 11A is a sixth diagram illustrating a specific example of the MSB prediction value calculation processing.

In step S706, in a case where it is determined that the average angle Ang does not satisfy the predetermined condition (the average angle Ang is any of the horizontal directions) (in the case of NO in step S706), the processing proceeds to step S707. For example, as illustrated in FIG. 11A, in the case where the reference direction specified by the average angle Ang is illustrated by the arrow 1101 as viewed from the position of the region to be processed, the angle is smaller than the arrow 1000 in FIG. 10. In such a case, the MSB prediction value estimation unit 630 determines that the average angle Ang does not satisfy the predetermined condition (the reference direction is the horizontal direction), and the processing proceeds to step S707.

Figure 11B:
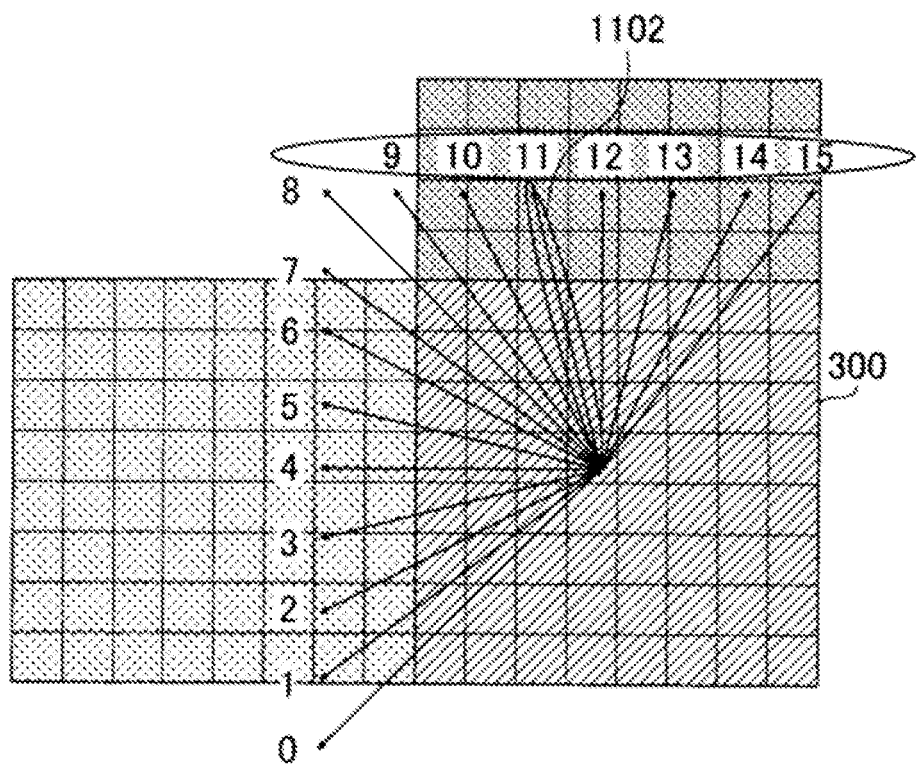
FIG. 11B is a seventh illustrating a specific example of the MSB prediction value calculation processing.

On the other hand, in step S706, in a case where it is determined that the average angle Ang satisfies the predetermined condition (in the case of YES in step S706), the processing proceeds to step S708. For example, as illustrated in FIG. 11B, in the case where the reference direction specified by the average angle Ang is illustrated by the arrow 1102 as viewed from the region to be processed, the angle is larger than the arrow 1000 in FIG. 10. In such a case, the MSB prediction value estimation unit 630 determines that the average angle Ang satisfies the predetermined condition (the reference direction is the vertical direction), and the processing proceeds to step S708.

In step S708, the MSB prediction value estimation unit 630 inputs "1" to the MSB prediction value. Furthermore, in step S707, the MSB prediction value estimation unit 630 inputs "0" to the MSB prediction value.

<Functional Configuration of Variable Length Encoding Unit>

Figure 12A:
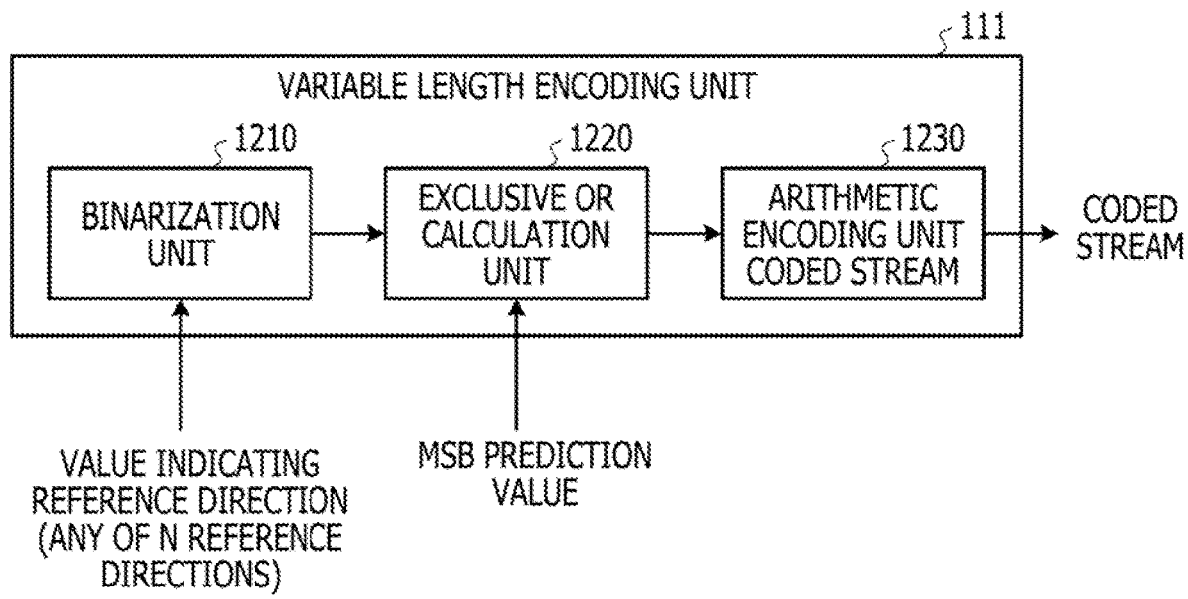
FIG. 12A is a first diagram illustrating details of a functional configuration of a variable length encoding unit of the encoding device.
Figure 12B:
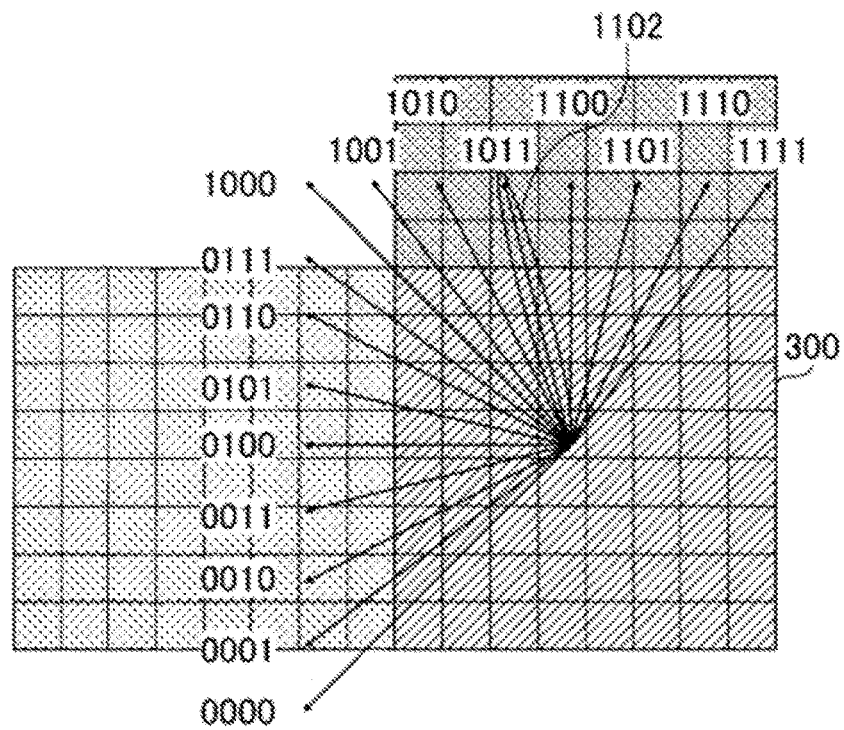
FIG. 12B is a second diagram illustrating details of a functional configuration of the variable length encoding unit of the encoding device.

Next, details of a functional configuration of the variable length encoding unit 111 will be described. FIGS. 12A and 12B are first and second diagrams illustrating details of a functional configuration of the variable length encoding unit of the encoding device.

As illustrated in FIG. 12A, the variable length encoding unit 11 includes a binarization unit 1210, an exclusive OR calculation unit 1220, and an arithmetic encoding unit 1230.

The binarization unit 1210 acquires the value indicating a reference direction (the value indicating any of the N reference directions) output from the intra prediction unit 108. The binarization unit 1210 binarizes the acquired value indicating a reference direction.

The exclusive OR calculation unit 1220 acquires a binary signal of the value indicating a reference direction from the binarization unit 1210. Furthermore, the exclusive OR calculation unit 1220 acquires the MSB prediction value from the intra reference direction estimation unit 110.

Moreover, the exclusive OR calculation unit 1220 calculates an exclusive OR of the most significant bit value of the binary signal of the value indicating a reference direction and the MSB prediction value, and notifies the arithmetic encoding unit 1230. Furthermore, the exclusive OR calculation unit 1220 notifies the arithmetic encoding unit 1230 of a value of a bit string other than the most significant bit, of the binary signal of the value indicating a reference direction.

The arithmetic encoding unit 1230 arithmetically encodes the exclusive OR of the most significant bit value and the MSB prediction value notified from the exclusive OR calculation unit 1220 in a context mode. Furthermore, the arithmetic encoding unit 1230 arithmetically encodes the value of a bit string other than the most significant bit in a bypass mode.

FIG. 12B is a diagram illustrating an example of the binary signal of the value indicating a reference direction. As illustrated in FIG. 12B, in a case where N (N=16) reference directions are defined, the binary signal of the value indicating a reference direction is one of "0000" to "1111".

Here, it is assumed that the binarization unit 1210 has acquired "11" as the value indicating a reference direction from the intra prediction unit 108, the binarization unit 1210 notifies the exclusive OR calculation unit 1220 of "1011" as the binary signal of the value indicating a reference direction (see the arrow 1102).

Furthermore, it is assumed that the exclusive OR calculation unit 1220 has acquired "1" as the MSB prediction value from the intra reference direction estimation unit 110. In this case, the exclusive OR calculation unit 1220 notifies the arithmetic encoding unit 1230 of "0" as the exclusive OR of the most significant bit value ("1") of "1011" and the MSB prediction value ("1")

Furthermore, the exclusive OR calculation unit 1220 notifies the arithmetic encoding unit 1230 of the value ("011") of the bit string other than the most significant bit, of "1011" that is the binary signal of the value indicating a reference direction.

Thereby, the arithmetic encoding unit 1230 arithmetically encodes "1" in the context mode and arithmetically encodes "011" in the bypass mode.

<Functional Configuration of Decoding Device>

Next, a functional configuration of the decoding device will be described. The decoding program is installed in the decoding device, and when the program is executed, the decoding device decodes the coded stream received from the encoding device 100 via the network (not illustrated) and outputs the moving image data.

Figure 13:
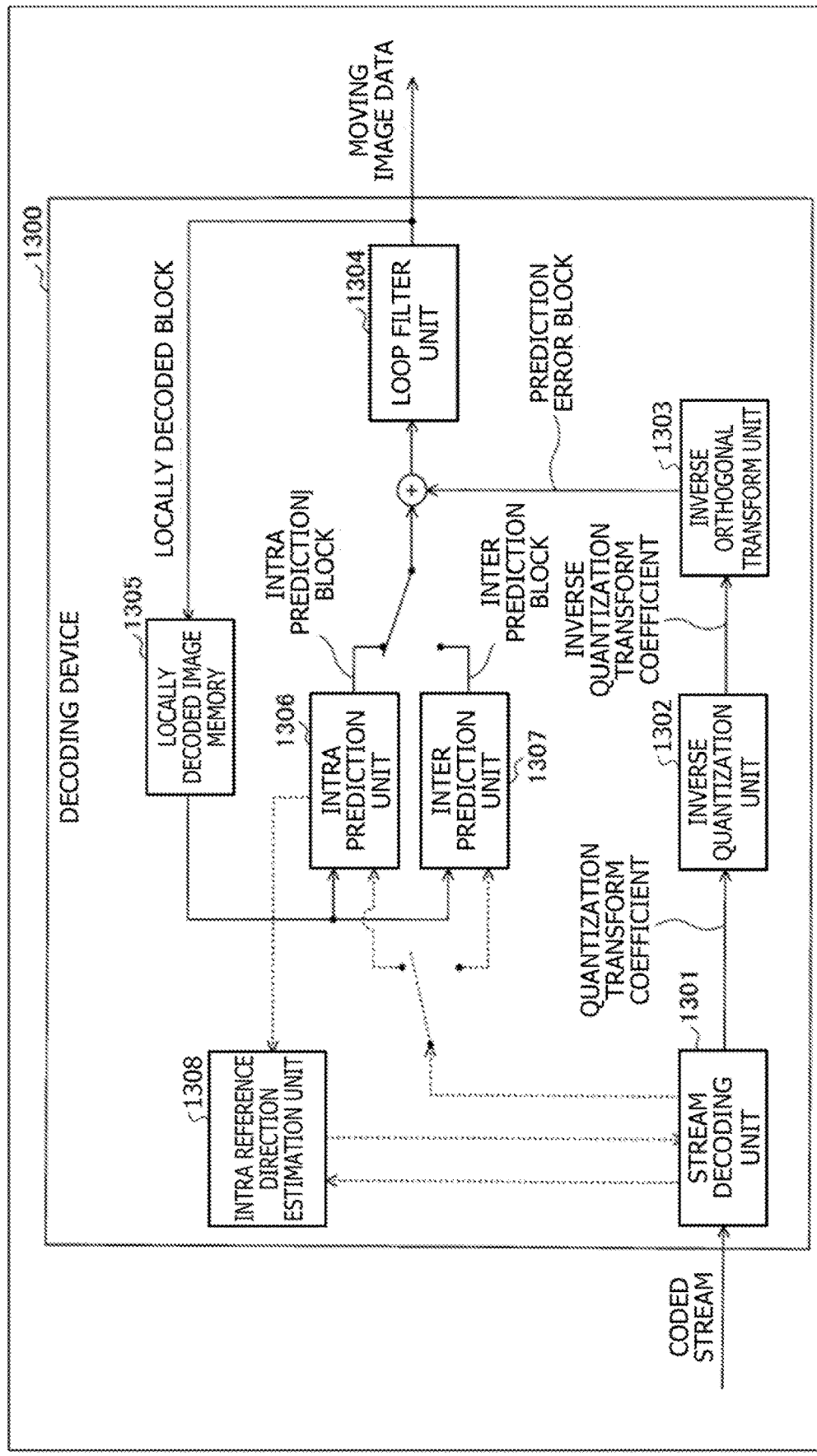
FIG. 13 is a diagram illustrating an example of a functional configuration of a decoding device.

FIG. 13 is a diagram illustrating an example of a functional configuration of the decoding device. As illustrated in FIG. 13, a decoding device 1300 includes a stream decoding unit 1301, an inverse quantization unit 1302, an inverse orthogonal transform unit 1303, a loop filter unit 1304, and a locally decoded image memory 1305. Furthermore, the decoding device 1300 includes an intra prediction unit 1306, an inter prediction unit 1307, and an intra reference direction estimation unit 1308.

The stream decoding unit 1301 is an example of a decoding unit. The stream decoding unit 1301 decodes the coded stream by a decoding method of CABAC, and notifies the inverse quantization unit 1302 of a quantization coefficient of the block to be processed. Furthermore, the stream decoding unit 1301 acquires the information regarding a position of each region in the block to be processed by decoding the coded stream, and notifies the intra reference direction estimation unit 1308.

Moreover, the stream decoding unit 1301 acquires the MSB prediction value notified from the intra reference direction estimation unit 1308, and outputs the value indicating a reference direction calculated using the acquired MSB prediction value to the intra prediction unit 1306.

The inverse quantization unit 1302 performs inverse quantization for the quantization coefficient notified from the stream decoding unit 1301 to calculate an inverse quantization coefficient. Furthermore, the inverse quantization unit 1302 notifies the inverse orthogonal transform unit 1303 of calculated inverse quantization coefficient.

The inverse orthogonal transform unit 1303 performs inverse orthogonal transform for the inverse quantization coefficient notified from the inverse quantization unit 1302 to generate a prediction error block. The prediction block generated in the prediction unit to be described below (the intra prediction unit 1306 or the inter prediction unit 1307) is added to the prediction error block generated in the inverse orthogonal transform unit 1303, so that a locally decoded block is generated.

The loop filter unit 1304 filters the generated locally decoded block, using a deblocking filter or the like, and outputs the filtered locally decoded block in frame units to output moving image data.

Furthermore, the loop filter unit 1304 stores the filtered locally decoded block in the locally decoded image memory 1305.

The intra prediction unit 1306 is an example of a prediction unit, and performs intra prediction to generate an intra prediction block. Specifically, the intra prediction unit 1306 acquires the value indicating a reference direction from the stream decoding unit 1301. Furthermore, the intra prediction unit 1306 refers to the locally decoded block for which the intra prediction has been performed, the locally decoded block being a block adjacent to the upper side or left side of the block to be processed, in the locally decoded image memory 1305, and performs the intra prediction, on the basis of the acquired value indicating a reference direction.

The inter prediction unit 1307 performs inter prediction for the block to be processed, using the locally decoded block in another frame, to generate an inter prediction block.

In the decoding device 1300, either the intra prediction unit 1306 or the inter prediction unit 1307 is executed on the basis of information obtained by decoding the coded stream.

The intra reference direction estimation unit 1308 is an example of the estimation unit. In the case where the intra prediction unit 1306 is executed, the intra reference direction estimation unit 1308 acquires the information regarding a position notified from the stream decoding unit 1301. Moreover, the intra reference direction estimation unit 1308 acquires the information regarding the intra prediction notified from the intra prediction unit 1306.

Furthermore, the intra reference direction estimation unit 1308 estimates an MSB prediction value in the block to be processed on the basis of the acquired information regarding a position or the acquired information regarding the intra prediction. Moreover, the intra reference direction estimation unit 1308 outputs the estimated MSB prediction value to the stream decoding unit 1301.

<Functional Configuration of Stream Decoding Unit>

Figure 14:
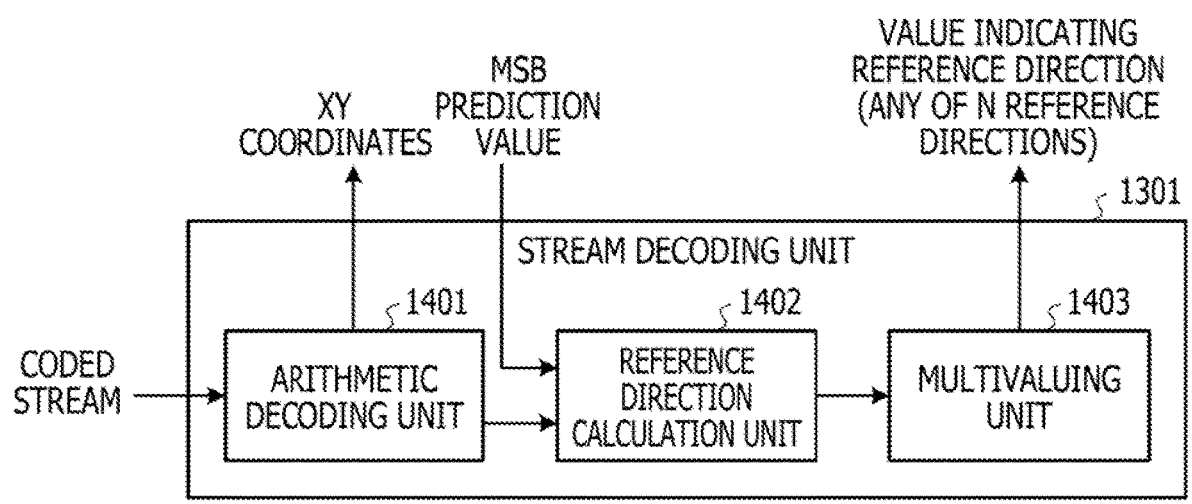
FIG. 14 is a diagram illustrating details of a functional configuration of a stream decoding unit of the decoding device.

Next, details of a functional configuration of the stream decoding unit 1301 will be described. FIG. 14 is a diagram illustrating details of a functional configuration of the stream decoding unit of the decoding device.

As illustrated in FIG. 14, the stream decoding unit 1301 includes an arithmetic decoding unit 1401, a reference direction calculation unit 1402, and a multivaluing unit 1403.

The arithmetic decoding unit 1401 acquires the information regarding a position of each region of the block to be processed by decoding the coded stream, and notifies the intra reference direction estimation unit 1308. Furthermore, the arithmetic decoding unit 1401 acquires a binary signal obtained by binarizing the value indicating a reference direction by decoding the coded stream, the exclusive OR being calculated from the most significant bit value of the binary signal and the MSB prediction value. Moreover, the arithmetic decoding unit 1401 notifies the reference direction calculation unit 1402 of the acquired binary signal.

The reference direction calculation unit 1402 calculates the binary signal of the value indicating a reference direction, using the binary signal notified from the arithmetic decoding unit 1401 and the MSB prediction value notified from the intra reference direction estimation unit 1308. Furthermore, the reference direction calculation unit 1402 notifies the multivaluing unit 1403 of the calculated binary signal of the value indicating the reference direction.

The multivaluing unit 1403 multivalues the binary signal of the value indicating the reference direction notified by the reference direction calculation unit 1402 to calculate the value indicating the reference direction, and notifies the intra prediction unit 1306.

<Functional Configuration of Intra Reference Direction Estimation Unit>

Figure 15:
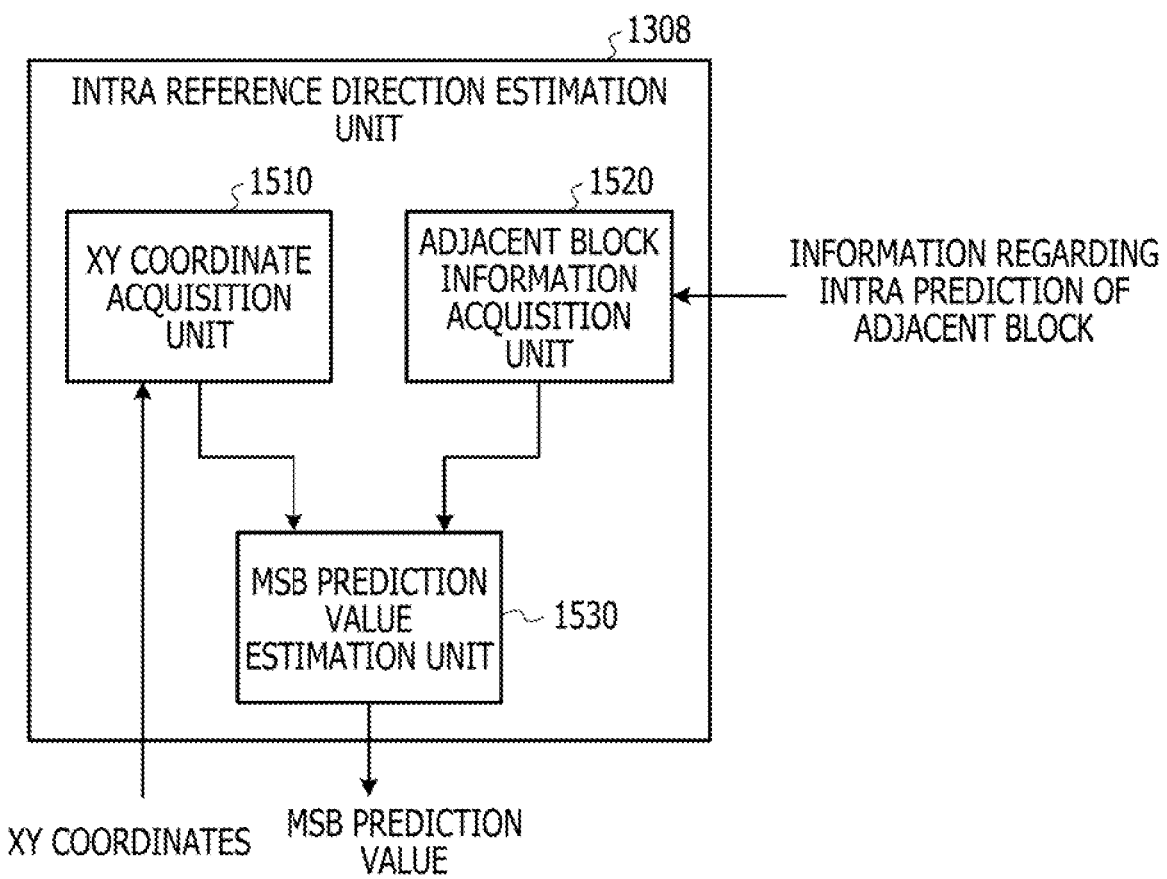
FIG. 15 is a diagram illustrating details of a functional configuration of an intra reference direction estimation unit of the decoding device.

Next, details of a functional configuration of the intra reference direction estimation unit 1308 of the decoding device 1300 will be described. FIG. 15 is a diagram illustrating details of a functional configuration of an intra reference direction estimation unit of the decoding device. As illustrated in FIG. 15, the intra reference direction estimation unit 1308 of the decoding device 1300 includes an XY coordinate acquisition unit 1510, an adjacent block information acquisition unit 1520, and an MSB prediction value estimation unit 1530. Note that the function of the intra reference direction estimation unit 1308 of the decoding device 1300 is the same as the function (XY coordinate acquisition unit 610 to MSB prediction value estimation unit 630) of the intra reference direction estimation unit 110 of the encoding device 100, and thus description is omitted here.

As is clear from the above description, the encoding device and the decoding device according to the first embodiment estimate the MSB prediction value on the basis of the information regarding the intra prediction of when the intra prediction has been performed for the adjacent block in the intra prediction in the angle prediction mode.

Furthermore, the encoding device and the decoding device according to the present embodiment binarize the value indicating the reference direction selected when the intra prediction has been performed and arithmetically encode the exclusive OR of the most significant bit of the binary signal and the MSB prediction value in the block to be processed.

Thereby, the encoding device and the decoding device according to the first embodiment can increase the occurrence probability of the most significant bit when arithmetically encoding the binary signal of the value indicating the reference direction. As a result, the probability of realizing arithmetic encoding in the context mode instead of arithmetic encoding in the bypass mode becomes possible for the most significant bit, and the code amount at the time generating the coded stream can be reduced.

Second Embodiment

In the above first embodiment, a case of calculating the MSB prediction value according to the flowchart illustrated in FIG. 7 has been described. However, the method for calculating the MSB prediction value is not limited to the case. For example, a table that defines an MSB prediction value corresponding to information regarding intra prediction of adjacent blocks and information regarding a position of each region to be processed is prepared in advance. Then, an intra reference direction estimation unit may calculate the MSB prediction value on the basis of the table. Hereinafter, a second embodiment will be described focusing on differences from the above first embodiment.

<Functional Configuration of Intra Reference Direction Estimation Unit>

Figure 16:
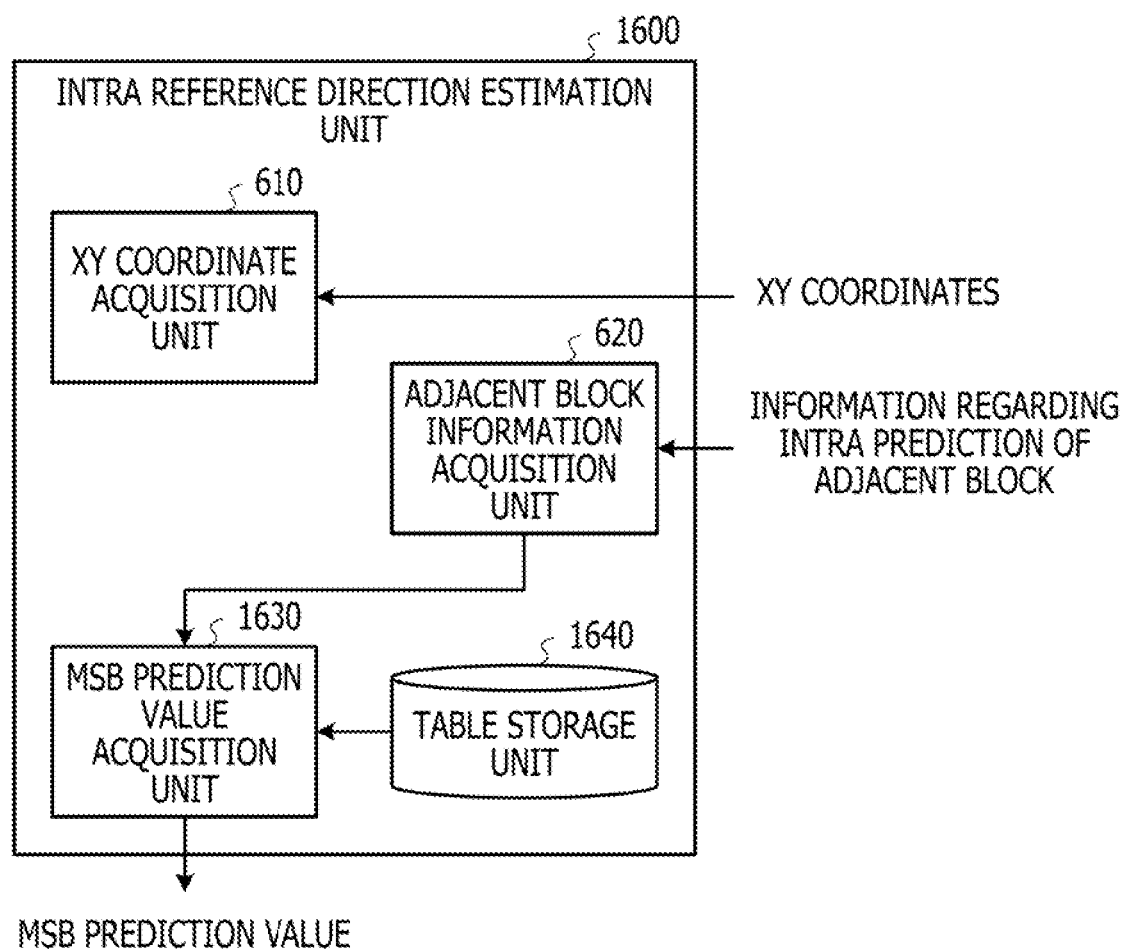
FIG. 16 is a diagram illustrating details of a functional configuration of an intra reference direction estimation unit of an encoding device according to a second embodiment.

First, a functional configuration of an intra reference direction estimation unit of an encoding device according to the second embodiment will be described. FIG. 16 is a diagram illustrating details of a functional configuration of the intra reference direction estimation unit of the encoding device according to the second embodiment. A difference from the intra reference direction estimation unit 110 of the encoding device according to the first embodiment described with reference to FIG. 6 is in including an MSB prediction value acquisition unit 1630 in a case of an intra reference direction estimation unit 1600.

The MSB prediction value acquisition unit 1630 acquires information regarding a position notified from an XY coordinate acquisition unit 610, and information regarding intra prediction of adjacent blocks notified from an adjacent block information acquisition unit 620.

Furthermore, the MSB prediction value acquisition unit 1630 acquires an MSB prediction value corresponding to the acquired information regarding a position and the acquired information regarding intra prediction of adjacent blocks from a table storage unit 1640 as an example of a storage unit.

<Specific Example of Table Stored in Table Storage Unit>

Next, a specific example of the table stored in the table storage unit 1640 will be described. FIGS. 17A to 17C are first to third diagrams illustrating specific examples of the table stored in the table storage unit. The examples in FIGS. 17A to 17C illustrate a case in which sixteen reference directions (IdxT) are specified in an upper adjacent block and sixteen reference directions (IdxL) are specified in a left adjacent block for a block to be processed.

Note that, in the examples in FIGS. 17A to 17C, the sixteen reference directions specified in the upper adjacent block are divided into four ranges ($0 \leq IdxT \leq 4$, $5 \leq IdxT \leq 7$, $8 \leq IdxT \leq 12$, and $13 \leq IdxT \leq 15$). Similarly, in the examples in FIGS. 17A to 17C, the sixteen reference directions specified in the left adjacent block are divided into four ranges ($0 \leq IdxL \leq 4$, $5 \leq IdxL \leq 7$, $8 \leq IdxL \leq 12$, and $13 \leq IdxL \leq 15$). Then, in each table, the MSB prediction value is specified in association with each range.

Among the tables, the table in FIG. 17A illustrates the MSB prediction values of a case where an X coordinate and a Y coordinate of a region to be processed are equal. Furthermore, the table in FIG. 17B illustrates the MSB prediction values of a case where the X coordinate and the Y coordinate of the region to be processed have a relationship of "the X coordinate>the Y coordinate". Moreover, the table in FIG. 17C illustrates the MSB prediction values of a case where the X coordinate and the Y coordinate of the region to be processed have a relationship of "the X coordinate<the Y coordinate".

Note that the tables in FIGS. 17A to 17C are stored in a table storage unit on a decoding device side, and an MSB prediction value acquisition unit of the decoding device side acquires the MSB prediction values by similar processing.

<Flow of MSB Prediction Value Calculation Processing by Intra Reference Direction Estimation Unit>

Figure 18:
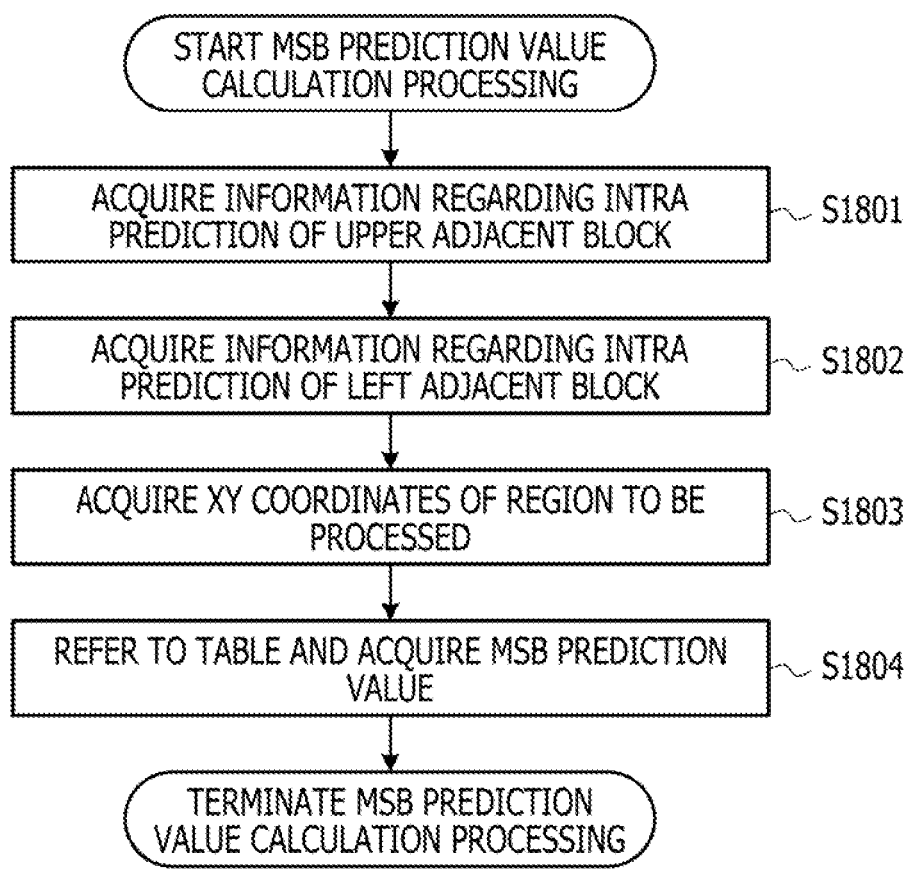
FIG. 18 is a flowchart illustrating a flow of MSB prediction value calculation processing by the intra reference direction estimation unit of the encoding device according to the second embodiment.

Next, a flow of MSB prediction value calculation processing by the intra reference direction estimation unit of the encoding device according to the second embodiment will be described. FIG. 18 is a flowchart illustrating a flow of MSB prediction value calculation processing by the intra reference direction estimation unit of the encoding device according to the second embodiment.

In step S1801, the adjacent block information acquisition unit 620 acquires the information regarding intra prediction of the upper adjacent block from among the information regarding intra prediction of adjacent blocks.

In step S1802, the adjacent block information acquisition unit 620 acquires the information regarding intra prediction of the left adjacent block from among the information regarding intra prediction of adjacent blocks.

In step S1803, the XY coordinate acquisition unit 610 acquires information (X coordinate and Y coordinate) indicating a position of the region to be processed.

In step S1804, the MSB prediction value acquisition unit 1630 refers to the table (FIGS. 17A to 17C, and the like) in the table storage unit 1640 on the basis of the information acquired in steps S1801 to S1803, and acquires the MSB prediction value.

As is clear from the above description, the encoding device and the decoding device according to the second embodiment prepare the table that defines the MSB prediction value corresponding to the information regarding intra prediction of adjacent blocks and the information regarding a position of each region to be processed in advance. Then, the encoding device and the decoding device calculate the MSB prediction value of each region of the block to be processed on the basis of the table in intra prediction in an angle prediction mode.

Thereby, the encoding device and the decoding device according to the second embodiment can increase the occurrence probability of the most significant bit when arithmetically encoding a binary signal of a value indicating a reference direction, similarly to the above first embodiment. As a result, a probability of realizing arithmetic encoding in a context mode instead of arithmetic encoding in a bypass mode becomes possible for the most significant bit, and a code amount at the time generating a coded stream can be reduced.

Other Embodiment

The above second embodiment has been described in such a way that the table storage unit is provided in each of the intra reference direction estimation unit of the encoding device and the intra reference direction estimation unit of the decoding device, and the same tables are stored in advance. However, the table sharing method is not limited to the case.

For example, the encoding device side may dynamically determine the table on the basis of statistics or the like, and transmit the determined table by adding the table to a header of a coded stream. Examples of the header used at this time include "slice_segmeny_header ( )" or the like in the case of H.265/HEVC.

Furthermore, the above first and second embodiments have been described in such a way that the encoding device and the decoding device are separate devices, but the encoding device and the decoding device may be an integrated device.

Note that the present embodiment is not limited to the configurations and the like described here, and may include combinations of the configurations or the like described in the above embodiments with other elements, and the like. These points can be changed without departing from the spirit of the present invention, and can be appropriately determined according to application modes of the points.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding device comprising:
a memory; and
a processor coupled to the memory and configured to:
estimate a prediction value in a reference direction that is selected when intra prediction in an angle prediction mode is performed in a block to be processed on the basis of a value indicating a reference direction selected when the intra prediction in the angle prediction mode has been performed in an adjacent block adjacent to the block to be processed;
binarize the value indicating the reference direction selected when the intra prediction in the angle prediction mode has been performed in the block to be processed to generate a binary signal;
perform arithmetic encoding in a context mode, for an exclusive OR of a bit value corresponding to a most significant bit of the binary signal and the prediction value; and
perform arithmetic encoding in a bypass mode, for a bit string of the binary signal other than the most significant bit of the binary signal.

2. The encoding device according to claim 1, wherein the processor estimates the prediction value for each position in the block to be processed on the basis of a value indicating a reference direction selected when the intra prediction in the angle prediction mode has been performed in an upper adjacent block adjacent to an upper side of the block to be processed and a left adjacent block adjacent to a left side of the block to be processed.

3. The encoding device according to claim 2, wherein the processor estimates the prediction value according to a position in the block to be processed in a case where the intra prediction in the angle prediction mode has not been performed both in the upper adjacent block and the left adjacent block.

4. The encoding device according to claim 1, wherein the processor estimates the prediction value by determining whether the reference direction selected when the intra prediction in the angle prediction mode is performed in the block to be processed belongs to a horizontal direction group or a vertical direction group.

5. The encoding device according to claim 2, wherein the processor:
stores, in a table in advance for each position in the block to be processed, the prediction value according to the value indicating the reference direction selected when the intra prediction in the angle prediction mode has been performed in the upper adjacent block and the left adjacent block, and estimates the prediction value by referring to the table.

6. An encoding method executed by a computer, the encoding method comprising processing of:
estimating a prediction value in a reference direction that is selected when intra prediction in an angle prediction mode is performed in a block to be processed on the basis of a value indicating a reference direction selected when the intra prediction in the angle prediction mode has been performed in an adjacent block adjacent to the block to be processed; and
binarizing the value indicating the reference direction selected when the intra prediction in the angle prediction mode has been performed in the block to be processed to generate a binary signal;
performing arithmetic encoding in a context mode, for an exclusive OR of a bit value corresponding to a most significant bit of the binary signal and the prediction value; and
performing arithmetic encoding in a bypass mode, for a bit string of the binary signal other than the most significant bit of the binary signal.

7. A decoding device comprising:
a memory; and
a processor coupled to the memory and configured to:
estimate a prediction value in a reference direction that is selected when intra prediction in an angle prediction mode is performed in a block to be processed on the basis of a value indicating a reference direction selected when the intra prediction in the angle prediction mode has been performed in an adjacent block adjacent to the block to be processed;
acquire a binary signal of the value indicating the reference direction selected when the intra prediction in the angle prediction mode has been performed in the block to be processed by decoding a coded stream which are acquired by performing arithmetic encoding in a context mode, for an exclusive OR of a bit value corresponding to a most significant bit of the binary signal and the prediction value and performing arithmetic encoding in a bypass mode, for a bit string of the binary signal other than the most significant bit of the binary signal;
multivalue a comparison result between the bit value and the prediction value; and
perform, in the block to be processed, the intra prediction in the angle prediction mode, using the value indicating the reference direction obtained by the multivaluing.

8. The decoding device according to claim 7, wherein the processor estimates the prediction value for each position in the block to be processed on the basis of the value indicating the reference direction selected when the intra prediction in the angle prediction mode has been performed in an upper adjacent block adjacent to an upper side of the block to be processed and a left adjacent block adjacent to a left side of the block to be processed.

9. The decoding device according to claim 8, wherein the processor estimates the prediction value according to a position in the block to be processed in a case where the intra prediction in the angle prediction mode has not been performed both in the upper adjacent block and the left adjacent block.

10. The decoding device according to claim 7, wherein the processor estimates the prediction value by determining whether the reference direction selected when the intra prediction in the angle prediction mode is performed in the block to be processed belongs to a horizontal direction group or a vertical direction group.

11. The decoding device according to claim 8, wherein the processor:
stores, in a table in advance for each position in the block to be processed, the prediction value according to the value indicating the reference direction selected when the intra prediction in the angle prediction mode has been performed in the upper adjacent block and the left adjacent block, wherein estimates the prediction value by referring to the table.

* * * * *